US009152844B2

(12) United States Patent
Ohto

(10) Patent No.: US 9,152,844 B2
(45) Date of Patent: Oct. 6, 2015

(54) SHAPE MEASURING DEVICE, SHAPE MEASURING METHOD, AND METHOD FOR MANUFACTURING GLASS PLATE

(71) Applicant: ASAHI GLASS COMPANY, LIMITED, Tokyo (JP)

(72) Inventor: Kimiaki Ohto, Tokyo (JP)

(73) Assignee: ASAHI GLASS COMPANY, LIMTED, Tokyo (JP)

( * ) Notice: Subject to any disclaimer, the term of this patent is extended or adjusted under 35 U.S.C. 154(b) by 210 days.

(21) Appl. No.: 13/706,206

(22) Filed: Dec. 5, 2012

(65) Prior Publication Data

US 2013/0094714 A1     Apr. 18, 2013

(30) Foreign Application Priority Data

Jun. 7, 2010   (JP) ................................. 2010-130387

(51) Int. Cl.
| | |
|---|---|
| *G06K 9/00* | (2006.01) |
| *G01B 11/24* | (2006.01) |
| *C03B 25/08* | (2006.01) |
| *G06T 7/00* | (2006.01) |
| *G06K 9/20* | (2006.01) |

(52) U.S. Cl.
CPC ............ *G06K 9/00201* (2013.01); *C03B 25/08* (2013.01); *G01B 11/24* (2013.01); *G06K 9/2036* (2013.01); *G06T 7/0057* (2013.01); *G06T 7/0075* (2013.01); *G06T 2207/10012* (2013.01)

(58) Field of Classification Search
USPC ......... 382/100, 106–108, 141, 154, 162, 168, 382/173, 181, 193–194, 199, 203, 209, 382/219–220, 232, 254, 274, 276, 285–295, 382/305, 312; 365/601, 612, 603, 239.1; 428/1.32
See application file for complete search history.

(56) References Cited

U.S. PATENT DOCUMENTS

| | | | |
|---|---|---|---|
| 2,253,054 A | 8/1941 | Tuttle et al. | |
| 2,816,474 A | 12/1957 | Powell | |
| 4,859,861 A | 8/1989 | Mersch | |
| 5,210,592 A | 5/1993 | Bretschneider | |
| 5,298,974 A | 3/1994 | Chandley | |
| 5,309,222 A | 5/1994 | Kamei et al. | |
| 5,880,843 A | 3/1999 | Hermosillo-Valadez et al. | |
| 6,392,754 B1 * | 5/2002 | Pingel et al. | ................... 356/603 |
| 7,394,536 B2 * | 7/2008 | Sonda et al. | ............... 356/239.1 |
| 2005/0238237 A1 | 10/2005 | Haeusler et al. | |
| 2008/0316501 A1 * | 12/2008 | Hirata et al. | ................... 356/601 |
| 2009/0195774 A1 | 8/2009 | Kawakami | |
| 2010/0028567 A1 * | 2/2010 | Suizu et al. | ................... 428/1.32 |
| 2010/0060905 A1 * | 3/2010 | Wienand | ....................... 356/612 |

FOREIGN PATENT DOCUMENTS

| | | |
|---|---|---|
| JP | S51-12155 | 1/1976 |
| JP | 55-140102 | 11/1980 |
| JP | 3-276005 | 12/1991 |
| JP | 07-128032 | 5/1995 |
| JP | 11-148813 | 6/1999 |
| JP | 11-257930 | 9/1999 |
| JP | 2003-192361 A | 7/2003 |
| JP | 2005-345383 | 12/2005 |
| JP | 2007-322162 A | 12/2007 |
| JP | 2008-039767 | 2/2008 |
| JP | 2009-128098 | 6/2009 |
| JP | 2009-181492 | 8/2009 |
| JP | 2010-197391 | 9/2010 |
| WO | WO-98/17971 | 4/1998 |

OTHER PUBLICATIONS

International Search Report PCT/JP2011/062943 dated Aug. 2, 2011.
Markus C. Knauer et al., "Phase Measuring Deflectometry: a new approach to measure specular free-form surfaces", Proceedings of SPIE, 2004, v.5457, pp. 366-376.
Extended European Search Report dated Jun. 22, 2015 issued in Application No. 11792404.3.
Petz, M. et al., "Measurement of optically effective surfaces by imaging of gratings," Proceedings of SPIE—International Society for Optical Engineering, US, vol. 5144, Jan. 1, 2003, pp. 288-294.

* cited by examiner

*Primary Examiner* — Seyed Azarian
(74) *Attorney, Agent, or Firm* — Foley & Lardner LLP

(57) ABSTRACT

The present invention provides a technology capable of measuring three-dimensional shapes by applying a stereo method even in the case that an object has a specular surface. A shape measuring apparatus 1 is equipped with a pattern position specification section 20 (before-movement pattern position specification section, after-movement pattern position specification section), an image capturing position calculation section 30 (before-movement image capturing position calculation section, after-movement image capturing calculation section), a pixel area specification section 40 (second pixel area specification section), an inclination angle calculation section 50 (before-movement inclination angle calculation section, after-movement inclination angle calculation section), a height-direction coordinate determination section 60, and an output section 80.

10 Claims, 11 Drawing Sheets

SHAPE MEASURING DEVICE, SHAPE MEASURING METHOD, AND METHOD FOR MANUFACTURING GLASS PLATE

TECHNICAL FIELD

The present invention relates to a shape measuring apparatus, a shape measuring method, and a glass plate production method. More particularly, the present invention relates to a shape measuring apparatus and a shape measuring method for measuring the three-dimensional shape of an object using a stereo method, and to a glass plate production method.

BACKGROUND ART

Conventionally, as a technology for measuring the three-dimensional shape of an object, a technology (stereo method) in which the image of an object is captured in two directions and the spatial coordinates of a given point on the object are recognized has been used as disclosed in JP-A-2009-181492, for example.

SUMMARY OF THE INVENTION

Problem to be solved by the Invention

However, in the case that an object has a specular surface, it is difficult to apply the conventional stereo method because the same point on the specular surface cannot be recognized in two directions. Hence, the conventional stereo method has a problem that the three-dimensional shape of an object having a specular surface (for example, glass) cannot be measured. The present invention has been made in consideration of these circumferences, and provides a technology capable of measuring three-dimensional shapes by applying the stereo method even in the case that an object has a specular surface.

Means for Solving the Problem

For the purpose of solving the above-mentioned problem, a shape measuring apparatus serving as an embodiment of the present invention is equipped with a calculation section configured to: calculate an inclination angle at one position on a specular surface of an object to be measured at a time when a height direction coordinate of the object to be measured is assumed as one height direction coordinate on based on a captured image which is obtained by capturing an image of the specular surface of the object to be measured so that a shape thereof is measured and in which a reflected image of a pattern disposed at a periphery of the object to be measured is captured; and calculate an inclination angle at the same position when the height direction coordinate is assumed as the same height direction coordinate based on another captured image obtained similarly after the object to be measured is moved by a predetermined amount; and a determination section configured to: compare both the inclination angles at the position before and after the object to be measured is moved by the predetermined amount; and determine the height direction coordinate at the time of coincidence as the height direction coordinate at the position of the object to be measured.

For the purpose of solving the above-mentioned problem, a shape measuring apparatus serving as another embodiment of the present invention is equipped with a calculation section configured to calculate an inclination angle at one position on a specular surface of an object to be measured at a time when a height direction coordinate of the object to be measured is assumed as one height direction coordinate and an inclination angle at another position adjacent to the one position based on a captured image which is obtained by capturing an image of the specular surface of the object to be measured so that a shape thereof is measured and in which a reflected image of a pattern disposed at a periphery of the object to be measured is captured; and a determination section configured to: compare the inclination angle at the one position of the object to be measured with the inclination angle at the another position thereof and determine the height direction coordinate at the time of coincidence as the height direction coordinate at the one position of the object to be measured.

For the purpose of solving the above-mentioned problem, a shape measuring apparatus serving as another embodiment of the present invention, for measuring a shape of an object to be measured using captured images captured before and after a movement of the object to be measured having a specular surface by an image capturing device disposed at a fixed position and captured by reflecting a pattern disposed at a fixed position to the specular surface of the object to be measured, including: a before-movement pattern position specification section configured to specify a before-movement image capturing pattern position serving as a position on a pattern image-captured in a before-movement captured image used as the captured image before the movement and on the pattern image-captured in a predetermined first pixel area of the image capturing device; a before-movement image capturing position calculation section configured to: assume the height direction coordinate of the object to be measured as one height direction coordinate; and calculate a before-movement image capturing position serving as a position located on the specular surface of the object to be measured before the movement in which the height direction coordinate is assumed as the one height direction coordinate and image-captured in the first pixel area from the one height direction coordinate and the first pixel area a before-movement inclination angle calculation section configured to calculate a before-movement inclination angle serving as the inclination angle at the before-movement image capturing position at the time when the height direction coordinate is assumed as the one height direction coordinate from the first pixel area, the before-movement image capturing pattern position, and the before-movement image capturing position at the time when the height direction coordinate is assumed as the one height direction coordinate; an after-movement image capturing position calculation section configured to calculate an after-movement image capturing position serving as a position located on the specular surface of the object to be measured after the movement in which the height direction coordinate is assumed as the one height direction coordinate and corresponding to the before-movement image capturing position at the time when the height direction coordinate is assumed as the one height direction coordinate; a second pixel area specification section configured to specify a second pixel area in which the after-movement image capturing position at the time when the height direction coordinate is assumed as the one height direction coordinate is image-captured in the pixel area of the image capturing device and in an after-movement captured image serving as the captured image after the movement; an after-movement pattern position specification section configured to specify an after-movement image capturing pattern position serving as a position on the pattern image-captured in the after-movement captured image and on the pattern image-captured in the second pixel area; an after-movement inclination angle calculation section configured to calculate an after-movement inclination angle serving as an inclination angle at the after-movement image capturing position at the time when the height direction coordinate is assumed as the one height direction coordinate from the after-movement image capturing position at the time when the height direction coordinate of the object to be measured is assumed as one height direction coordinate, the second pixel area, and the after-movement image capturing pattern position; and a height-direction coordinate determination section configured to compare the before-movement inclination angle with the after-movement inclination angle at the time when the height direction coordinate of the object to be measured is assumed as one height direction coordinate; and determine the height direction coordinate at the time of coincidence as the height direction coordinate at the before-movement image capturing position of the object to be measured.

The above-mentioned shape measuring apparatus may be further equipped with an output section configured to output shape information of the specular surface of the object to be measured on based on the height direction coordinate at each before-movement image capturing position determined by the height-direction coordinate determination section.

For the purpose of solving the above-mentioned problem, a shape measuring apparatus serving as another embodiment of the present invention, for measuring a shape of an object to be measured using captured images of the object to be measured having a specular surface captured by an image capturing device disposed at a fixed position and captured by reflecting a pattern disposed at a fixed position to the specular surface of the object to be measured, including: a first pattern position specification section configured to specify a first image capturing pattern position serving as a position on the pattern image-captured in the captured image and on the pattern image-captured in a predetermined first pixel area of the image capturing device; a second pattern position specification section configured to specify a second image capturing pattern position serving as a position on the pattern image-captured in the captured image and on the pattern image-captured in a predetermined second pixel area of the image capturing device; a first image capturing position calculation section configured to assume the height direction coordinate of the object to be measured as one height direction coordinate; and calculate a first image capturing position serving as a position located on the specular surface of the object to be measured in which the height direction coordinate is assumed as the one height direction coordinate and image-captured in the first pixel area from the one height direction coordinate and the first pixel area; a first inclination angle calculation section configured to calculate a first inclination angle serving at the inclination angle at the first image capturing position at the time when the height direction coordinate is assumed as the one height direction coordinate from the first pixel area, the first image capturing pattern position, and the first image capturing position at the time when the height direction coordinate is assumed as the one height direction coordinate; a second image capturing position calculation section configured to calculate a second image capturing position serving as a position located on the specular surface of the object to be measured in which the height direction coordinate is assumed as the one height direction coordinate and image-captured in the second pixel area from the second pixel area, the first image capturing position at the time when the height direction coordinate is assumed as the one height direction coordinate, and the first inclination angle; a second inclination angle calculation section configured to calculate a second inclination angle serving as the inclination angle at the second image capturing position at the time when the height direction coordinate is assumed as the one height direction coordinate from the second pixel area, the second image capturing pattern position, and the second image capturing position at the time when the height direction coordinate of the object to be measured is assumed as the one height direction coordinate; and a height-direction coordinate determination section configured to compare the first inclination angle with the second inclination angle at the time when the height direction coordinate of the object to be measured is assumed as one height direction coordinate and determining the height direction coordinate at the time of coincidence as the height direction coordinate at the first image capturing position of the object to be measured.

The above-mentioned shape measuring apparatus may be further equipped with an output section configured to output processing information according to which the object to be measured is processed based on the height direction coordinate at each first image capturing position determined by the height-direction coordinate determination section.

For the purpose of solving the above-mentioned problem, a shape measuring method serving as another embodiment of the present invention, for measuring a shape of an object to be measured using captured images captured before and after a movement of the object to be measured having a specular surface by an image capturing device disposed at a fixed position and captured by reflecting a pattern disposed at a fixed position to the specular surface of the object to be measured, including: specifying a before-movement image capturing pattern position serving as a position on the pattern image-captured in a before-movement captured image used as the captured image before the movement and on the pattern image-captured in a predetermined first pixel area of the image capturing device; assuming the height direction coordinate of the object to be measured as one height direction coordinate, and calculating a before-movement image capturing position serving as a position located on the specular surface of the object to be measured before the movement in which the height direction coordinate is assumed as the one height direction coordinate and image-captured in the first pixel area from the one height direction coordinate and the first pixel area; calculating a before-movement inclination angle serving as the inclination angle at the before-movement image capturing position at the time when the height direction coordinate is assumed as the one height direction coordinate from the first pixel area, the before-movement image capturing pattern position, and the before-movement image capturing position at the time when the height direction coordinate is assumed as the one height direction coordinate; calculating an after-movement image capturing position serving as a position located on the specular surface of the object to be measured after the movement in which the height direction coordinate is assumed as the one height direction coordinate and corresponding to the before-movement image capturing position at the time when the height direction coordinate is assumed as the one height direction coordinate; specifying a second pixel area in which the after-movement image capturing position at the time when the height direction coordinate is assumed as the one height direction coordinate is image-captured in the pixel area of the image capturing device and in an after-movement captured image serving as the captured image after the movement; specifying an after-movement image capturing pattern position serving as a position on the pattern image-captured in the after-movement captured image and on the pattern image-captured in the second pixel area; calculating an after-movement inclination angle serving as an inclination angle at the after-movement image capturing position at the time when the height direction coordinate is assumed as the one height direction coordinate from the after-movement image capturing position at the time when the height direction coordinate of the object to be measured is assumed as one height direction coordinate, the second pixel area and the after-movement image capturing pattern position; and comparing the before-movement inclination angle with the after-movement inclination angle at the time when the height direction coordinate of the object to be measured is assumed as one height direction coordinate, and determining the height direction coordinate at the time of coincidence as the height direction coordinate at the before-movement image capturing position of the object to be measured.

For the purpose of solving the above-mentioned problem, a shape measuring method serving as another embodiment of the present invention, for measuring a shape of an object to be measured using captured images of the object to be measured having a specular surface captured by an image capturing device disposed at a fixed position and captured by reflecting a pattern disposed at a fixed position to the specular surface of the object to be measured, including: specifying a first image capturing pattern position serving as a position on the pattern image-captured in the captured image and on the pattern image-captured in a predetermined first pixel area of the image capturing device; specifying a second image capturing pattern position serving as a position on the pattern image-captured in the captured image and on the pattern image-captured in a predetermined second pixel area of the image capturing device; assuming the height direction coordinate of the object to be measured as one height direction coordinate, and calculating a first image capturing position serving as a position located on the specular surface of the object to be measured in which the height direction coordinate is assumed as the one height direction coordinate and image-captured in the first pixel area from the one height direction coordinate and the first pixel area; calculating a first inclination angle serving as the inclination angle at the first image capturing position at the time when the height direction coordinate is assumed as the one height direction coordinate from the first pixel area, the first image capturing pattern position, and the first image capturing position at the time when the height direction coordinate is assumed as the one height direction coordinate; calculating a second image capturing position serving as a position located on the specular surface of the object to be measured in which the height direction coordinate is assumed as the one height direction coordinate and image-captured in the second pixel area from the second pixel area, the first image capturing position at the time when the height direction coordinate is assumed as the one height direction coordinate, and the first inclination angle; calculating a second inclination angle serving as the inclination angle at the second image capturing position at the time when the height direction coordinate is assumed as the one height direction coordinate from the second pixel area, the second image capturing pattern position, and the second image capturing position at the time when the height direction coordinate is assumed as the one height direction coordinate; and comparing the first inclination angle with the second inclination angle at the time when the height direction coordinate of the object to be measured is assumed as one height direction coordinate, and determining the height direction coordinate at the time of coincidence as the height direction coordinate at the first image capturing position of the object to be measured.

For the purpose of solving the above-mentioned problem, a glass plate production method including: melting glass raw materials to obtain molten glass; forming the molten glass into a continuous plate-shaped glass ribbon; slowly cooling the glass ribbon while moving the glass ribbon; and cutting off the glass ribbon, the production method further including: measuring the height direction coordinate of the glass ribbon from the reference face thereof between the slow cooling and the cutting off using the above-mentioned shape measuring apparatus, and controlling slow coaling conditions in the slow cooling based on the height direction coordinate obtained in the measuring.

Effects of the Invention

With the present invention, three-dimensional shapes can be measured by applying a stereo method even in the case that an object has a specular surface. Furthermore, by the use of the shape measuring apparatus or the shape measuring method according to the present invention, glass products with high quality in shape, more specifically, glass plates with less risk of warpage or the like can be produced.

MODES FOR CARRYING OUT THE INVENTION

First Embodiment

Figure 1:
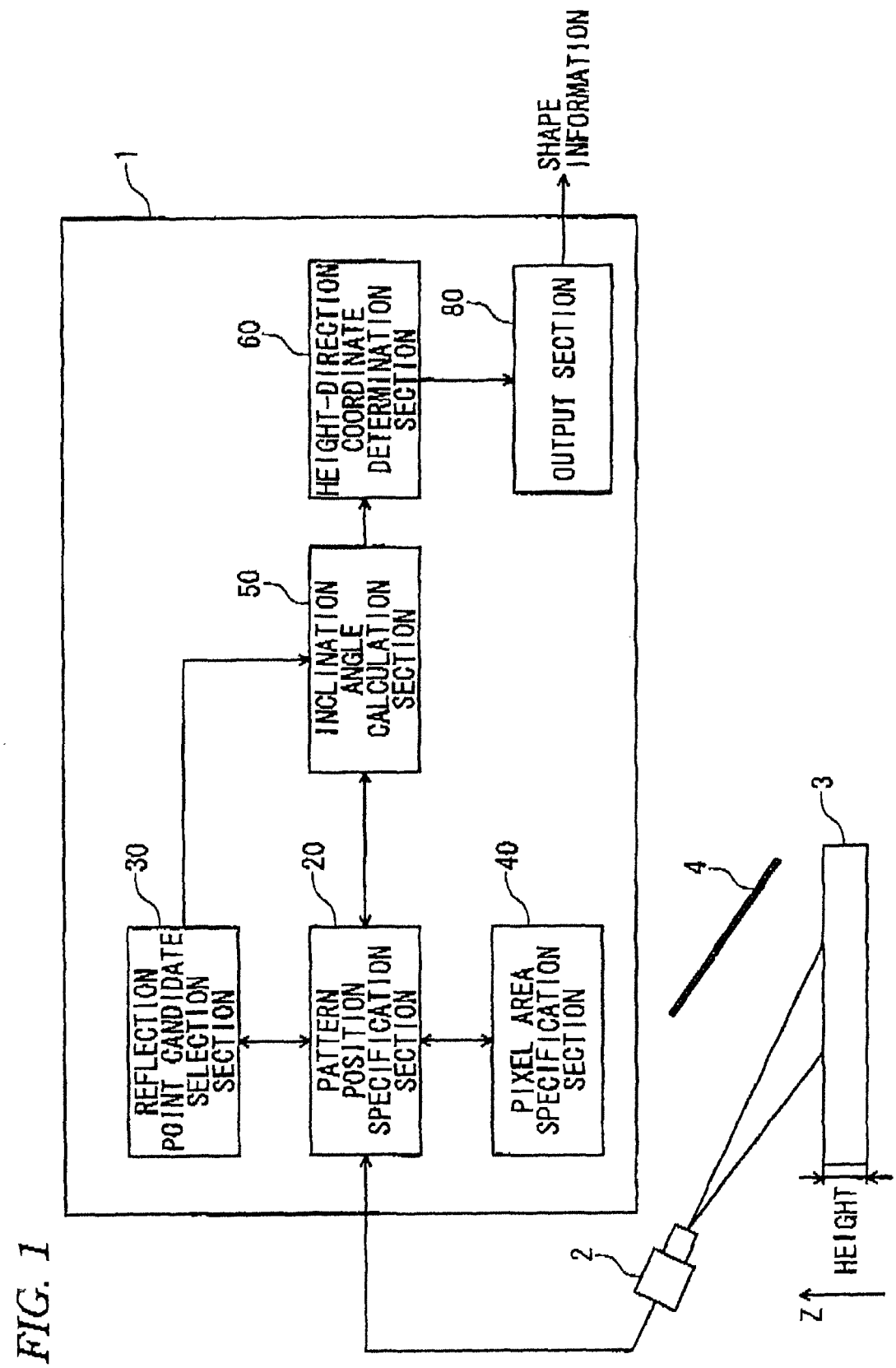
FIG. 1 is an example of a function block diagram of a shape measuring apparatus 1 according to a first embodiment of the present invention.

A first embodiment according to the present invention will be described below referring to the drawings.

FIG. 1 is an example of a function block diagram of a shape measuring apparatus 1 according to the first embodiment of the present invention. In FIG. 1, the surface of a glass material 3 serving as an object to be measured (an object having a specular surface) by the shape measuring apparatus 1 has a three-dimensional shape formed of a curved surface. A pattern 4 having a predetermined pattern (for example, a grid-shaped pattern) is disposed above the glass material 3, and the pattern of this pattern 4 is reflected and mirrored on the above-mentioned surface of the glass material 3.

Figure 9:
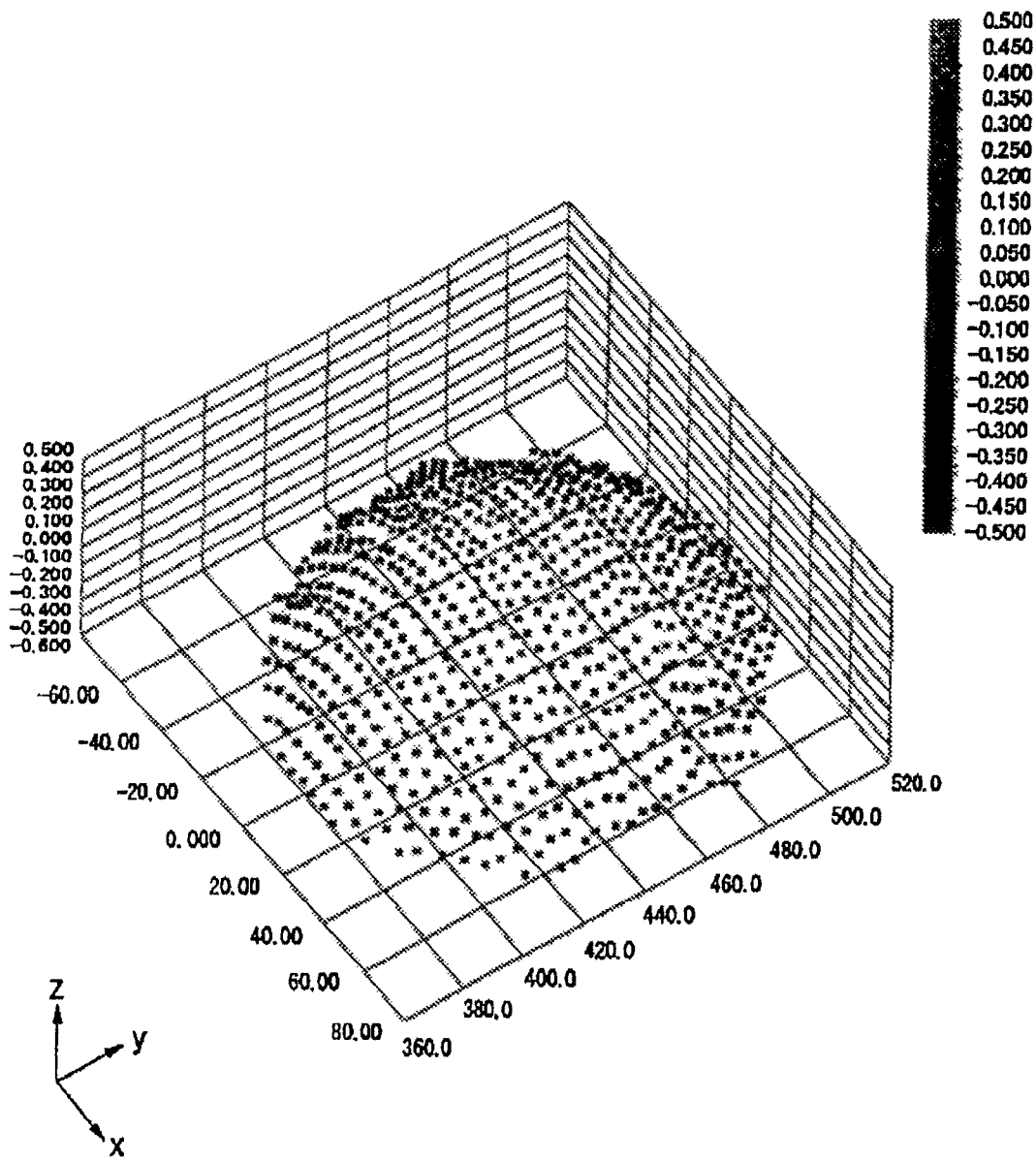
FIG. 9 is an output example based on shape information created using the shape measuring apparatuses 1 and 100.

The shape measuring apparatus 1 according to this embodiment captures the images of the pattern reflected on the surface of the glass material 3 using an image capturing device 2 before and after the glass material 3 is moved and calculates the coordinate (height direction coordinate) in the height direction (the z-direction shown in FIG. 1) at a measurement point on the surface of the glass material 3 using the two images obtained before and after the movements. Furthermore, the shape measuring apparatus 1 creates such shape information as shown in FIG. 9 and representing the three-dimensional shape of the surface of the glass material 3 on the basis of the coordinates calculated at each measurement point and then outputs the information to the outside. As a method for moving the glass material 3, conventional technology should only be used; a generally used conveyance apparatus, a table conveyer, or the like should only be used.

Figure 2:
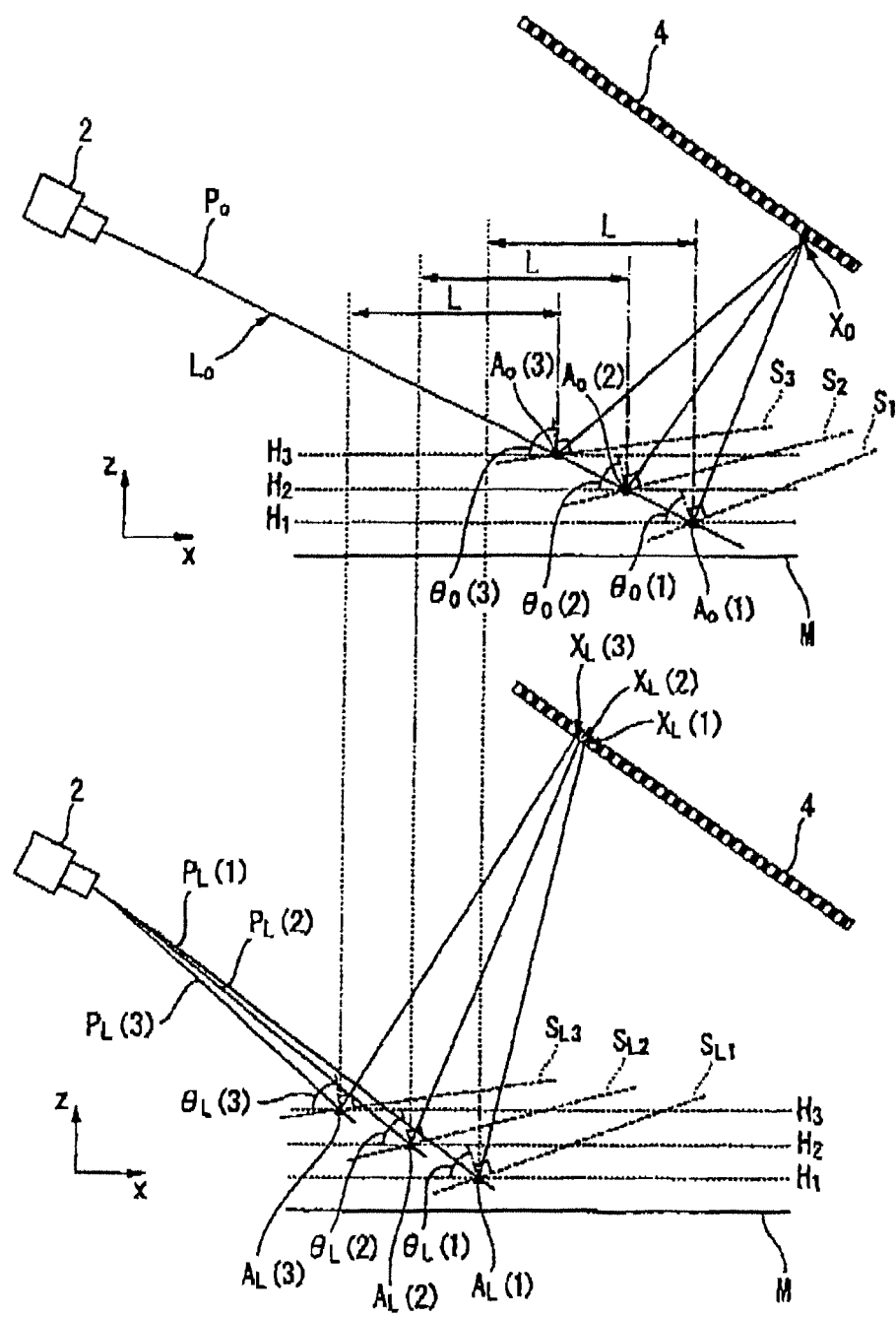
FIG. 2 is a schematic view illustrating the operation of the shape measuring apparatus 1.
Figure 3:
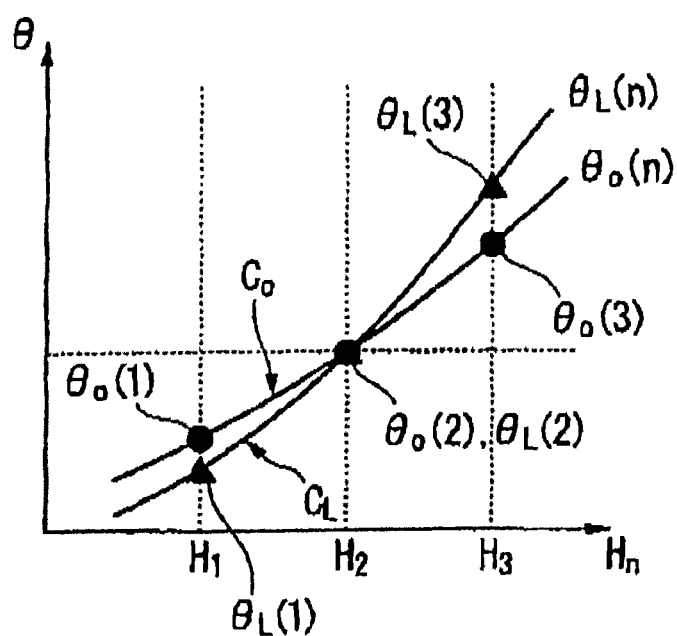
FIG. 3 is another schematic view illustrating the operation of the shape measuring apparatus 1.

Before the functions of the respective sections of the shape measuring apparatus 1 shown in FIG. 1 are described, the principle of measuring a three-dimensional shape using the shape measuring apparatus 1 will herein be described referring to FIGS. 2 and 3.

First, the image of the pattern of the pattern 4 reflected on the surface of the glass material 3 is captured by the image capturing device 2, and a check is performed to confirm which portion of the pattern 4 is depicted at a predetermined position (a pixel area $P_0$) inside the obtained image. For example, in the case that the pattern 4 is a grid-shaped pattern, a position inside the pattern 4 can be specified by counting the number of grids in the image. It is assumed that the position of a portion of the pattern 4 depicted in the pixel area $P_0$ is $X_0$ (see the upper part of FIG. 2).

At this time, the light beam emitted from the position $X_0$ of the pattern 4 is reflected by the surface of the glass material 3, and the image of the pixel area $P_0$ inside the captured image is formed; however, since the surface shape of the glass material 3 is unknown, the true reflection point on the glass material 3 is not uniquely determined (the reflection point is located somewhere on the straight line $L_0$ oriented in the direction of the pixel area $P_0$ as viewed from the image capturing device 2). FIG. 2 shows the candidates $A_0$ (1), $A_0$ (2), and $A_0$ (3) of three reflection points having different heights (the coordinate values in the z-direction measured from the reference face M shown in the figure). It is assumed that the heights of the reflection points $A_0$ (1), $A_0$ (2), and $A_0$ (3) are $H_1$, $H_2$, and $H_3$ ($H_1 < H_2 < H_3$), respectively. A coordinate in the height direction is hereafter simply referred to as a height in some cases.

In the case that the reflection point $A_0$ (1) having the height $H_1$ is assumed as the reflection point, it is supposed that the (assumed) tangent plane of the surface of the glass material 3 at this reflection point $A_0$ (1) has an inclination angle $\theta_0$ (1) that is equal to that of a reflection surface $S_1$ by which the light beam emitted from the position $X_0$ of the pattern 4 and incident on the reflection point $A_0$ (1) is reflected to the pixel area $P_0$ of the image capturing device 2. In the case that the reflection point $A_0$ (2) or $A_0$ (3) is assumed as the reflection point, the (assumed) tangent plane of the surface of the glass material 3 at each of these reflection points has an inclination angle $\theta_0$ (2) or $\theta_0$ (3) that is equal to that of a reflection surface $S_2$ or $S_3$ respectively corresponding thereto.

At this time as the reflection point is higher (that is, $A_0$ (2) is higher than $A_0$ (1), and $A_0$ (3) is further higher than $A_0$(2)), the incident angle of the light beam emitted from the position $X_0$ of the pattern 4 and incident on each of the reflection surfaces $S_1$, $S_2$, and $S_3$ becomes smaller; hence, a relationship of $\theta_0$ (1)<$\theta_0$ (2)<$\theta_0$ (3) is established (it is herein assumed that the inclination angle is defined as an angle formed by the minus direction of the x-axis shown in the figure and the normal line oriented to the upper side of each reflection surface in the figure). This relationship is represented by a curve $C_0$ in the graph of FIG. 3. In this way, the inclination angle $\theta_0$ (n) serves as a function of the height $H_n$ of the reflection point. However, as described above, it cannot be uniquely determined to which point on this curve $C_0$ the true reflection point corresponds.

Next, the glass material 3 is moved by a distance L, and after the movement, the image of the pattern of the pattern 4 reflected on the surface of the glass material 3 is captured again by the image capturing device 2 (see the lower part of FIG. 2). Since the glass material 3 has been moved, the above-mentioned assumed reflection point $A_0$ (1) having the height $H_1$ has been moved to a position $A_L$ (l) that is away from the original position thereof by the distance L while the height $H_1$ is maintained. The distance L can be set to any value, provided that the value is within the image capturing range of the image capturing device 2.

When it is herein assumed that the image capturing direction (the direction in which the image capturing device 2 is oriented) of the image capturing device 2 is known, the pixel area $P_L$ (1) capturing the position $A_L$ (1) inside the captured image after the movement of the glass material 3 is known from the relationship between the glass material 3 and the image capturing device 2. Then, a check is performed to confirm which portion of the pattern 4 is depicted in the pixel area $P_L$ (1) in a way similar to that performed before the movement of the glass material 3. It is assumed that the position of a portion of the pattern 4 depicted in the pixel area $P_L$ (1) is $X_L$(1).

At this time, the light beam emitted from the position $X_L$ (1) of the pattern 4 is reflected at the reflection point $A_L$ (1) an the surface of the glass material 3 after the movement, and the image of the pixel area $P_L$ (1) inside the image captured after the movement is formed. It is assumed that the inclination angle of the tangent plane (the reflection surface $S_{L1}$ for reflecting the light beam emitted from the position $X_L$(1) of the pattern 4 and incident on the reflection point $A_L$(1) to the pixel area $P_L$ (1) of the image capturing device 2) of the surface of the glass material 3 at the reflection point $A_L$ (1) is $\theta_L$(1).

In this way, even after the movement of the glass material 3, the relationship between the height $H_1$ and the inclination angle $\theta_L$ (1) at the reflection point $A_L$ (1) is established. Relationships are also established similarly between the height $H_2$ and the inclination angle $\theta_L$ (2) of the reflection surface $S_{L2}$ at the reflection point $A_L$ (2) and between the height $H_3$ and the inclination angle $\theta_L$ (3) of the reflection surface $S_{L3}$ at the reflection point $A_L$ (3).

It is not yet determined at this time which one of the reflection points $A_0$ (1), $A_0$ (2), and $A_0$ (3) is the true reflection point before the glass material 3 is moved; however, if one of the reflection points is the true reflection point, the inclination angle of the tangent plane of the surface of the glass material 3 at the reflection point before the movement is of the glass material 3 should be equal to that after the movement (because the reflection point before the movement is physically the same as that after the movement). The graph of FIG. 3 shows a state in which a curve $C_L$ representing the relationship between $Q_L$ (n) and $H_n$ after the movement of the glass material 3 intersects the curve $C_0$ at one point. Hence, in the case that $H_n$ at which $\theta_L$ (n)=$\theta_0$ (n) is established is found, the reflection point $A_0$ (n) corresponding thereto is the true reflection point, and the inclination angle $\theta_0$ (n) and the height $H_n$ at the reflection point have been obtained. In this way, the three-dimensional coordinate values of the one point $A_0$(n) on the glass material 3 are determined for the given pixel area $P_0$.

The above-mentioned measurement is performed at one point on the glass material 3 corresponding to the pixel area $P_0$: however, the true inclination angles $\theta_0$ (n) and the true heights $H_n$ at all the points on the surface of the glass material 3, that is, the three-dimensional shape of the surface of the glass material 3, can be obtained by performing a similar measurement for all the pixel areas in which image capturing is done.

Next, returning to FIG. 1, the functions of the respective sections of the shape measuring apparatus 1 based on the above-mentioned measurement principle will be described.

The shape measuring apparatus 1 is equipped with a pattern position specification section 20 (before-movement pattern position specification section, after-movement pattern position specification section), a reflection point candidate selection section 30 (before-movement image capturing position calculation section, after-movement image capturing position calculation section), a pixel area specification section 40 (second pixel area specification section), an inclination angle calculation section 50 (before-movement inclination angle calculation section, after-movement inclination angle calculation section), a height-direction coordinate determination section 60, and an output section 80. These respective sections are realized after predetermined programs are read and executed by a CPU.

From the image capturing device 2, the pattern position specification section 20 obtains an image (hereafter referred to as a before-movement captured image) obtained by capturing the image of the pattern of the pattern 4 reflected on the surface of the glass material 3 before the movement of the glass material 3. Then, the pattern position specification section 20 specifies which portion on the pattern 4 is depicted in the pixel area $P_0$ inside the obtained before-movement captured image (hereafter, the specified portion of the pattern 4 is referred to as a pattern position $X_0$). More specifically, the pattern position specification section 20 recognizes the pattern image-captured in the pixel area $P_0$ on the before-movement captured image through image processing and checks to which portion of the pattern 4 the recognized pattern corresponds (the pattern of the pattern 4 is known), thereby specifying the pattern position $X_0$ on the pattern 4 corresponding to the recognized pattern.

Furthermore, similarly, from the image capturing device 2, the pattern position specification section 20 obtains an image (hereafter referred to as an after-movement captured image) obtained by capturing the image of the pattern of the pattern 4 reflected on the surface of the glass material 3 after the movement of the glass material 3. Furthermore, the pattern position specification section 20 obtains information representing the pixel areas $P_L(1), P_L(2), P_L(3), \ldots$ from the pixel area specification section 40. Then, in a way similar to that described above, the pattern position specification section 20 specifies which portion on the pattern 4 is depicted in each pixel area $P_L(n)$ inside the after-movement captured image (hereafter, the specified portion of the pattern 4 is referred to as a pattern position $X_L(n)$).

On the basis of the pixel area $P_0$, the reflection point candidate selection section 30 calculates the reflection point candidates $A_0(1), A_0(2), A_0(3), \ldots$ at which the light beam emitted from the pattern position $X_0$ is reflected and directed to the pixel area $P_0$ with respect to the respective heights in the case that the heights on the surface of the glass material 3 are assumed to have various values. As shown in FIG. 2, these reflection point candidates $A_0(n)$ can be obtained as positions in which the straight line $L_0$ drawn from the image capturing device 2 to the pixel area $P_0$ passes through the surface of the glass material 3 having the assumed respective heights.

Furthermore, on the basis of the respective reflection point candidates $A_0(n)$, the reflection point candidate selection section 30 calculates the positions $A_L(1), A_L(2), A_L(3), \ldots$ serving as the movement destinations of the respective reflection point candidates $A_0(n)$ when the glass material 3 is moved by the distance L. As shown in FIG. 2, these respective positions $A_L(n)$ are the reflection point candidates in which the light beams from the pattern positions $X_L(n)$ are reflected and directed to the pixel areas $P_L(n)$ after the movement of the glass material 3. The reflection point candidates $A_L(n)$ can be obtained by moving the reflection point candidates $A_0(n)$ before the movement of the glass material 3 in parallel by the distance L.

On the basis of the respective reflection point candidates $A_L(n)$ after the movement of the glass material 3, the pixel area specification section 40 specifies the respective pixel areas $P_L(n)$ capturing the positions of the reflection point candidates $A_L(n)$ from among the pixel areas of the image capturing device 2. As shown in FIG. 2, these pixel areas $P_L(n)$ can be obtained on the basis of the positional relationship between the image capturing device 2 and the glass material 3 (the image capturing direction of the image capturing device 2 is known), that is, under a condition that the straight lines connecting the image capturing device 2 to the respective reflection point candidates $A_L(n)$ are coincident with the straight lines drawn from the image capturing device 2 to the pixel areas $P_L(n)$.

With respect to the respective reflection point candidates $A_0(n)$ before the movement of the glass material 3, the inclination angle calculation section 50 obtains the reflection surfaces by which the light beams emitted from the pattern position $X_0$ on the pattern 4 and incident on the reflection point candidates $A_0(n)$ are reflected to the pixel area $P_0$ of the image capturing device 2 and calculates the inclination angles $\theta_0(n)$ of the respective reflection surfaces. As shown in FIG. 2, the inclination angles of the reflection surfaces can be obtained under a condition that the angle (the incident angle of the light beam incident on each reflection point candidate $A_0(n)$) formed between the straight line connecting the pattern position $X_0$ to each reflection point candidate $A_0(n)$ and the normal line of the reflection surface is equal to the angle (the reflection angle of the light beam reflected from the reflection point candidate $A_0(n)$) formed between the straight line connecting each reflection point candidate $A_0(n)$ to the pixel area $P_0$ of the image capturing device 2 and the normal line of the reflection surface.

Furthermore, similarly, with respect to the respective reflection point candidates $A_L(n)$ after the movement of the glass material 3, the inclination angle calculation section 50 obtains the reflection surfaces by which the light beams emitted from the pattern position $X_L(n)$ respectively corresponding to the positions on the pattern 4 and incident on the reflection point candidates $A_L(n)$ are reflected to the corresponding pixel areas $P_L(n)$ of the image capturing device 2 and then calculates the inclination angles $\theta_L(n)$ of the respective reflection surfaces.

Figure 10:
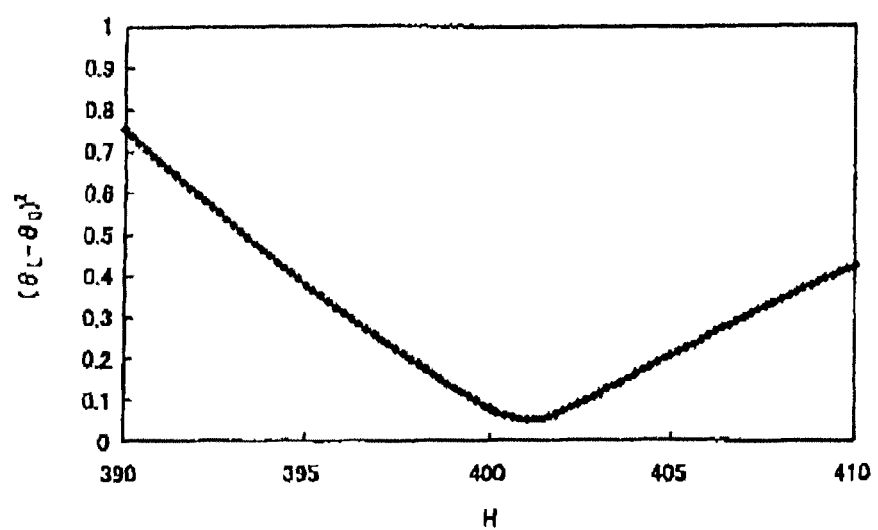
FIG. 10 is a schematic view illustrating the operation of the shape measuring apparatuses 1 and 100.

With respect to each assumed height described above (and the reflection point candidate $A_0(n)$ determined depending on the height) of the glass material 3, the height-direction coordinate determination section 60 compares $\theta_0(n)$ obtained as the inclination angle before the movement of the glass material 3 with $\theta_L(n)$ obtained as the inclination angle after the movement of the glass material 3. Then, the height-direction coordinate determination section 60 determines the reflection point candidate $A_0(n)$ and the assumed value of the height at the time when the values of both $\theta_0(n)$ and $\theta_L(n)$ are coincident with each other as the true reflection point $A_0$ of the glass material 3 corresponding to the pixel area $P_0$ and the true height of the glass material 3 at the reflection point $A_0$. In reality, strictly speaking, $\theta_0(n)$ and $\theta_L(n)$ do not become coincident due to measurement errors, etc. in some cases; hence, it may be possible to obtain the height of the glass material 3 so that the square of the difference between $\theta_0$ (n) and $\theta_L$ (n) becomes minimal (see FIG. 10). In this way, the three-dimensional coordinate values (the position in the horizontal directions and the position in the height direction) of one point (the reflection point $A_0$) on the glass material 3 in the direction as viewed from the image capturing device 2 to the pixel area $P_0$ are determined.

The output section 80 outputs the coordinate values (the coordinates of the position in the horizontal directions and the coordinate of the position in the height direction) of the position on the glass material 3 determined by the height-direction coordinate determination section 60. Furthermore, the output section 80 creates and outputs such shape information as shown in FIG. 9 and representing the surface shape of the glass material 3 on the basis of the respective coordinate values obtained by performing a similar measurement for numerous points on the glass material 3.

Figure 4:
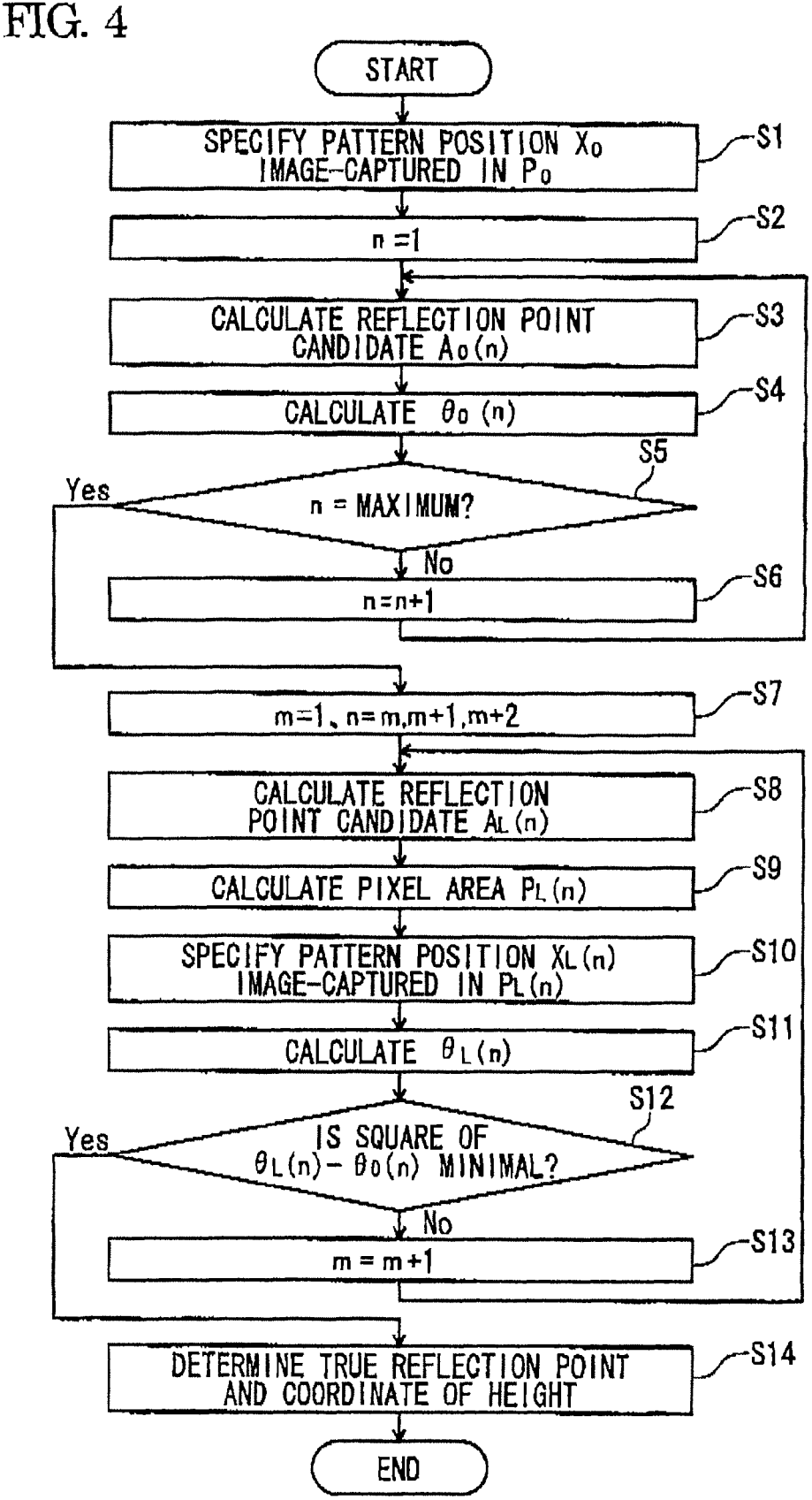
FIG. 4 is a flowchart showing an example of the operation of the shape measuring apparatus 1.

FIG. 4 is a flowchart showing an example of the operation of the shape measuring apparatus 1. The operation of the shape measuring apparatus 1 will be described below using the flowchart shown in FIG. 4. The flowchart is started when the pattern position specification section 20 obtains the before-movement captured image from the image capturing device 2.

In FIG. 4, from the pattern image-captured in the pixel area $P_0$ on the before-movement captured image, the pattern position specification section 20 having obtained the before-movement captured image specifies the pattern position $X_0$ on the pattern 4 corresponding to the pattern (at step S1).

Next, the reflection point candidate selection section 30 calculates the reflection point candidate $A_0$ (n) by the setting of n=1 (at step S2 and step S3).

Next, the inclination angle calculation section 50 obtains a reflection surface having the reflection point candidate $A_0$ (n) as the reflection point and calculates its inclination angle $\theta_0$ (n) (at step S4).

Then, the inclination angle calculation section 50 judges whether n has become a predetermined maximum value (whether all the reflection point candidates $A_0$ (n) and the inclination angles $\theta_0$ (n) have been calculated) (at step S5). In the case that n is not the maximum value (No at step S5), n is incremented by 1 (at step S6), and the processing from step S3 to step S5 is repeated.

In the case that n is the maximum value (Yes at step S5), the pattern position specification section 20 obtains the after-movement captured image from the image capturing device 2. Then, from the three reflection point candidates $A_0$ (n) by the setting of m=1, n=m, m+1, and m+2, the reflection point candidate selection section 30 calculates the corresponding three reflection point candidates $A_L$ (n) after the movement of the glass material 3 (at step S7 and step S8). The processing is hereafter executed for each of the three points.

Next, the pixel area specification section 40 specifies the pixel area $P_L$ (n) corresponding to the reflection point candidate $A_L$ (n) from among the pixel areas of the image capturing device 2 (at step S9).

Next, from the pattern image-captured in the pixel area $P_L$ (n) on the after-movement captured image, the pattern position specification section 20 specifies the pattern position $X_L$ (n) on the pattern 4 corresponding to the pattern (at step S10).

Next, the inclination angle calculation section 50 obtains a reflection surface having the reflection point candidate $A_L$ (n) as the reflection point and calculates its inclination angle $\theta_L$ (n) (at step S11).

Next, the height-direction coordinate determination section 60 obtains the square of the difference between the inclination angle $\theta_0$ (n) of each of the three points and the inclination angle $\theta_L$ (n) of each of the three points corresponding thereto, the inclination angles having been calculated as described above, and compares the difference of these, and then judges whether the difference is a minimal value (at step S12). In the case that the square of the difference between $\theta_0$ (n) and $\theta_L$ (n) is not a minimal value (No at step S12), m is incremented by 1 (at step S13); in other words, the processing from step SB to step S12 is repeated for the three points where n has been incremented by 1.

In the case that the square of the difference between $\theta_0$ (n) and $\theta_L$ (n) is a minimal value (Yes at step S12), the height-direction coordinate determination section 60 determines the reflection point candidate $A_0$ (n) corresponding to $\theta_0$ (n) at the time as the true reflection point of the glass material 3 in the direction as viewed from the image capturing device 2 to the pixel area $P_0$ and then determines the value $H_n$ assumed as the height of the reflection point candidate $A_0$ (n) as the height direction coordinate of the true reflection point $A_0$ (at step S14).

The flowchart is thus completed.

In the search for the true height direction coordinate, the processing thereof is not limited to that described above, and it is not always necessary to calculate all the values from the minimum value to the maximum value of n. As a method for searching for this kind of solution, various kinds of known speeding up algorithms can be used as necessary.

Second Embodiment

Next, a second embodiment according to the present invention will be described referring to the drawings.

Figure 5:
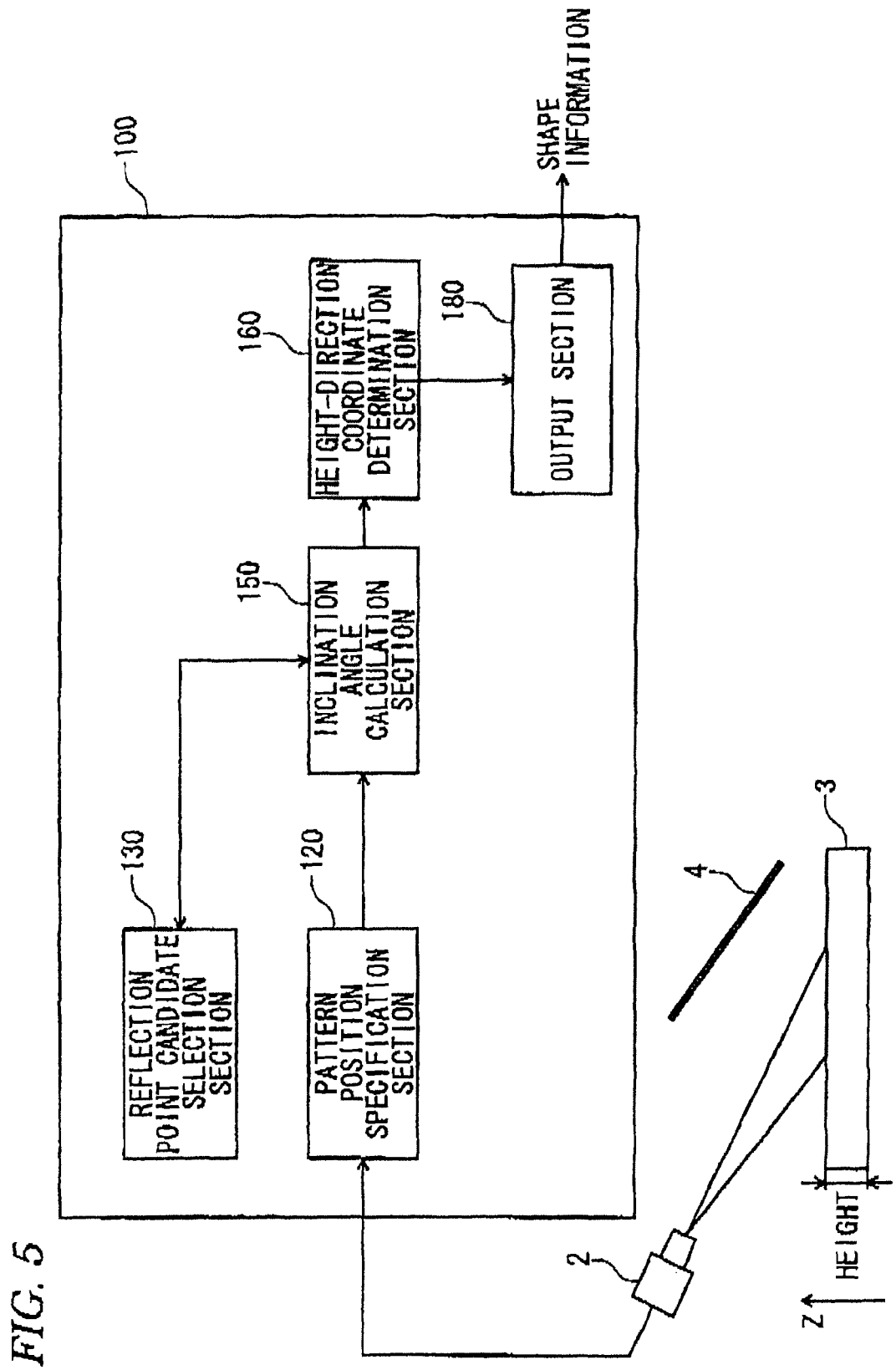
FIG. 5 is an example of a function block diagram of a shape measuring apparatus 100 according to a second embodiment of the present invention.

FIG. 5 is an example of a function block diagram of a shape measuring apparatus 100 according to the second embodiment of the present invention. In FIG. 5, the surface of a glass material 3 serving as an object to be measured (an object having a specular surface) by the shape measuring apparatus 100 has a three-dimensional shape formed of a curved surface. A pattern 4 having a predetermined pattern (for example, a grid-shaped pattern) is disposed above the glass material 3, and the pattern of this pattern 4 is reflected and mirrored on the above-mentioned surface of the glass material 3.

The shape measuring apparatus 100 according to this embodiment captures the image of the pattern reflected on the surface of the glass material 3 using an image capturing device 2 and calculates the coordinate (height direction coordinate) in the height direction (the z-direction shown in FIG. 5) at a measurement point on the surface of the glass material 3 by paying attention to two points inside one image obtained by image capturing. Furthermore, the shape measuring apparatus 100 creates such shape information as shown in FIG. 9 and representing the three-dimensional shape of the surface of the glass material 3 on the basis of the coordinates calculated at each measurement point and then outputs the information to the outside.

Figure 6:
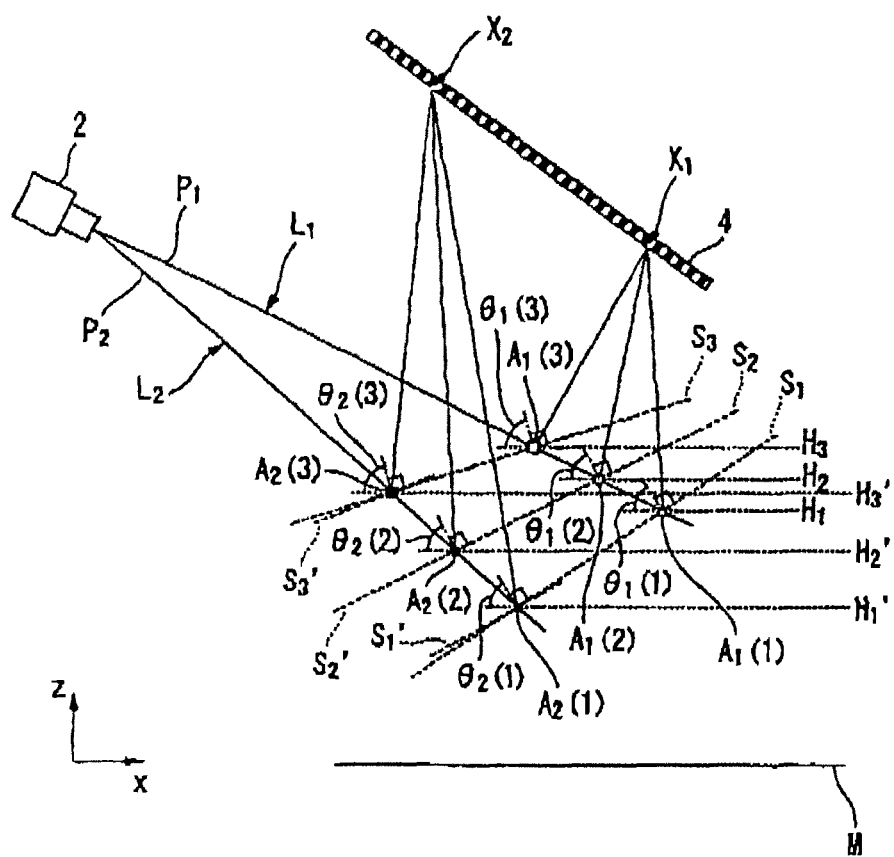
FIG. 6 is a schematic view illustrating the operation of the shape measuring apparatus 100.
Figure 7:
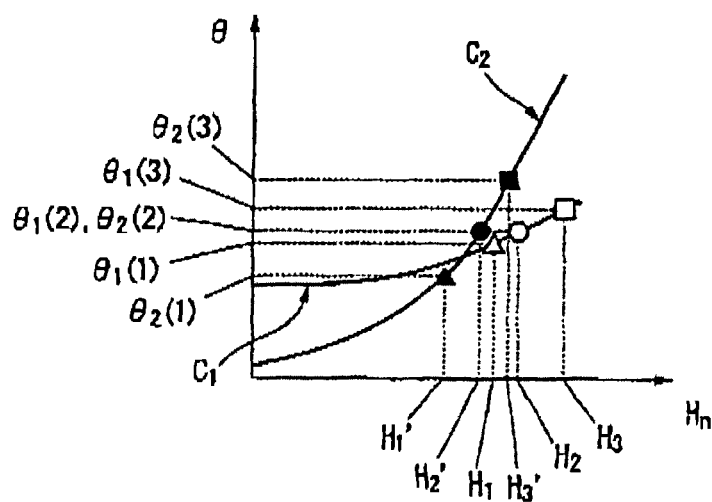
FIG. 7 is another schematic view illustrating the operation of the shape measuring apparatus 100.

Before the functions of the respective sections of the shape measuring apparatus 100 shown in FIG. 5 are described, the principle of measuring a three-dimensional shape using the shape measuring apparatus 100 will herein be described referring to FIGS. 6 and 7.

First, the image of the pattern of the pattern 4 reflected on the surface of the glass material 3 is captured by the image capturing device 2, and a check is performed to confirm which portion of the pattern 4 is depicted at one predetermined point (a pixel area $P_1$) inside the obtained image. For example, in the case that the pattern 4 is a grid-shaped pattern, a position inside the pattern 4 can be specified by counting the number of grids in the image. It is assumed that the position of a portion of the pattern 4 depicted in the pixel area $P_1$ is $X_1$.

At this time, the light beam emitted from the position $X_1$ of the pattern 4 is reflected by the surface of the glass material 3, and the image of the pixel area $P_1$ inside the captured image is formed; however, since the surface shape of the glass material 3 is unknown, the true reflection point on the glass material 3 is not uniquely determined (the reflection point is located somewhere on the straight line $L_1$ oriented in the direction of the pixel area $P_1$ as viewed from the image capturing device 2). FIG. 6 shows the candidates $A_1$ (1), $A_1$ (2), and $A_1$ (3) of three reflection points having different heights (the coordinate values in the z-direction measured from the reference face M shown in the figure). It is assumed that the heights of the reflection points $A_1$ (1), $A_1$ (2), and $A_1$ (3) are $H_1$, $H_2$, and $H_3$ ($H_1 < H_2 < H_3$), respectively.

In the case that the reflection point $A_1$ (1) having the height $H_1$ is assumed as the reflection point, it is supposed that the (assumed) tangent plane of the surface of the glass material 3 at this reflection point $A_1$ (1) has an inclination angle $\theta_1$ (1) that is equal to that of a reflection surface $S_1$ by which the light beam emitted from the position $X_1$ of the pattern 4 and incident on the reflection point $A_1$ (1) is reflected to the pixel area $P_1$ of the image capturing device 2. In the case that the reflection point $A_1$ (2) or $A_1$ (3) is assumed as the reflection point, the (assumed) tangent plane of the surface of the glass material 3 at each of these reflection points has an inclination angles $\theta_1$ (2) or $\theta_1$ (3) that is equal to that of a reflection surface $S_2$ or $S_3$ respectively corresponding thereto.

At this time, as the reflection point is higher (that is, $A_1$ (2) is higher than $A_1$ (1), and $A_1$ (3) is further higher than $A_1$ (2)), the incident angle of the light beam emitted from the position $X_1$ of the pattern 4 and incident on each of the reflection surfaces $S_1$, $S_2$, and $S_3$ becomes smaller; hence, a relationship of $\theta_1(1) < \theta_1(2) < \theta_1(3)$ is established (it is herein assumed that the inclination angle is defined as an angle formed by the minus direction of the x-axis shown in the figure and the normal line oriented to the upper side of each reflection surface in the figure). This relationship is represented by a curve $C_1$ in the graph of FIG. 7. In this way, the inclination angle $\theta_1$ (n) serves as a function of the height $H_n$ of the reflection point. However, as described above, it cannot be uniquely determined to which point on this curve $C_1$ the true reflection point corresponds.

The method of thinking described so far is the same as that of the first embodiment.

Next, inside the same image described above, a check is performed in a way similar to that described above to confirm which portion of the pattern 4 is depicted at a predetermined point (a pixel area $P_2$) other than the pixel area $P_1$. However, it is assumed that the pixel areas $P_1$ and $P_2$ are pixel areas adjacent to each other. When it is assumed that the position of a portion of the pattern 4 depicted in the pixel area $P_2$ is $X_2$, the reflection point on the glass material 3 by which the light beam emitted from the position $X_2$ of the pattern 4 is reflected to the pixel area $P_2$ of the image capturing device 2 is located somewhere on the straight line $L_2$ oriented in the direction of the pixel area $P_2$ as viewed from the image capturing device 2 (not uniquely determined), in a way similar to that described above.

In this embodiment, attention is paid to the intersection points $A_2$ (1), $A_2$ (2), $A_2$ (3), . . . of the above-mentioned (assumed) tangent planes (the reflection surfaces $S_1$, $S_2$, $S_3$, . . . ) passing through the reflection point candidates $A_1$ (1), $A_1$ (2), $A_1$ (3), . . . described previously and the straight line $L_2$. Since the pixel areas $P_1$ and $P_2$ are areas adjacent to each other, the point $A_1$ (n) and the $A_2$ (n) corresponding thereto are also adjacent to each other (n=1, 2, . . . ).

A presumption is herein made that the change in the shape of the glass material 3 is sufficiently gentle. It can thus be regarded that the tangent planes respectively passing through the two points adjacent to each other on the surface of the glass material 3 are the same plane. The state of being adjacent to each other means that the change in the shape of the glass material 3 has a negligibly small range, and two points adjacent to each other are set arbitrarily within this range.

Hence, provided that a point $A_1$ (k) in the above-mentioned reflection point candidates is the true reflection point on the glass material 3, a point $A_2$ (k) existing on the tangent plane (the reflection surface $S_k$) of the glass material 3 passing through this point $A_1$ (k) also exists on the glass material 3. Furthermore, when a reflection surface $S_k'$ by which the light beam from the position $X_2$ of the pattern 4 is reflected to the pixel area $P_2$ of the image capturing device 2 by using this point $A_2$ (k) as the reflection point is considered, the reflection surface (the tangent plane of the glass material 3 at the point $A_2$ (k)) becomes coincident with the tangent plane (the reflection surface $S_k$) of the glass material 3 at the point $A_1$ (k), whereby it is found that the inclination angle $\theta_2$ (k) thereof should be equal to the inclination angle $\theta_1$ (k). FIG. 6 shows a state that the point $A_1$ (2) is the true reflection point on the glass material 3.

On the other hand, with respect to the point $A_1$ (j) (wherein j≠k, and the point corresponds to the points $A_1$ (1) and $A_1$ (3) in FIG. 6) that is not the true reflection point on the glass material 3, the point $A_2$ (j) existing on the (assumed) tangent plane (the reflection surface $S_j$) of the glass material 3 passing through this point $A_1$ (j) is not a point on the glass material 3, and at this point $A_2$ (j), the inclination angle $\theta_2$ (j) of the reflection surface by which the light beam from the position $X_2$ of the pattern 4 is reflected to the pixel area $P_2$ of the image capturing device 2 is different from the inclination angle $\theta_1(j)$.

Hence, with respect to the above-mentioned intersection points $A_2$ (1), $A_2$ (2), $A_2$(3), of the (assumed) tangent planes (the reflection surfaces $S_1$, $S_2$, $S_3$, . . . ) passing through the reflection point candidates $A_1$ (1), $A_1$ (2), $A_1$ (3), . . . corresponding to the pixel area $P_1$ and the straight line $L_2$ determined by the pixel area $P_2$, in the case that the inclination angles $\theta_2$ (1), $\theta_2$ (2), $\theta_2$ (3), . . . of the respective (assumed) tangent planes (reflection surfaces $S_1'$, $S_2'$, $S_3'$, . . . ) are obtained and a reflection point candidate $A_1$ (k) in which $\theta_2$ (k)=$\theta_1$ (k) is established is found, the reflection point $A_1$ (k) is the true reflection point, and the inclination angle $\theta_1$(k) and the height $H_k$ at the reflection point have been obtained. In this way, the three-dimensional coordinate values of the one point $A_1$ (k) on the glass material 3 are determined for the given pixel area $P_1$.

In addition to the above-mentioned curve $C_1$, the graph of FIG. 7 shows a curve $C_2$ representing the relationship between the height $H'_n$ of each intersection point $A_2$ (n) described above and the inclination angle $\theta_2$ (n) of the tangent plane at each intersection point $A_2$ (n). In this graph, the point $A_1$ (2) in which the value of $\theta_1$(n) is equal to the value of $\theta_2$ (n) is the true reflection point on the glass material 3.

The above-mentioned measurement is performed at one point on the glass material 3 corresponding to the pixel area $P_1$; however, the true inclination angles $\theta_1$ (n) and the true heights $H_n$ at all the points on the surface of the glass material 3, that is, the three-dimensional shape of the surface of the glass material 3, can be obtained by performing a similar measurement for all the pixel areas in which image capturing is done.

Next, returning to FIG. 5, the functions of the respective sections of the shape measuring apparatus 100 based on the above-mentioned measurement principle will be described.

The shape measuring apparatus 100 is equipped with a pattern position specification section 120, a reflection point candidate selection section 130, an inclination angle calculation section 150, a height-direction coordinate determination section 160, and an output section 80. These respective sections are realized after predetermined programs are read and executed by a CPU.

From the image capturing device 2, the pattern position specification section 120 obtains an image (hereafter referred to as a captured image) obtained by capturing the image of the pattern of the pattern 4 reflected on the surface of the glass material 3. Then, the pattern position specification section 120 specifies which portion on the pattern 4 is depicted in the pixel area $P_1$ inside the obtained captured image (hereafter, the specified portion of the pattern 4 is referred to as a pattern position $X_1$). More specifically, the pattern position specification section 120 recognizes the pattern image-captured in the pixel area $P_1$ on the captured image and checks to which portion of the pattern 4 the recognized pattern corresponds (the pattern of the pattern 4 is known), thereby specifying the pattern position $X_1$ on the pattern 4 corresponding to the recognized pattern.

Furthermore, similarly, the pattern position specification section 120 specifies which portion on the pattern 4 is depicted in the pixel area $P_2$ (located adjacent to the pixel area $P_1$) inside the captured image (the same image) (hereafter, the specified portion of the pattern 4 is referred to as a pattern position $X_2$).

On the basis of the pixel area $P_1$, the reflection point candidate selection section 130 calculates the reflection point candidates $A_1(1)$, $A_1(2)$, $A_1(3)$, . . . at which the light beam emitted from the pattern position $X_1$ is reflected to the pixel area $P_1$ with respect to the respective heights in the case that the heights on the surface of the glass material 3 are assumed to have various values. As shown in FIG. 6, these reflection point candidates $A_1$ (n) can be obtained as positions in which the straight line $L_1$ drawn from the image capturing device 2 to the pixel area $P_1$ passes through the surface of the glass material 3 having the assumed respective heights.

Furthermore, from the inclination angle calculation section 150, the reflection point candidate selection section 130 obtains the values of the inclination angles $\theta_1(1)$, $\theta_1(2)$, $\theta_1(3)$ . . . of the respective reflection surfaces corresponding to the reflection point candidates $A_1(1)$, $A_1(2)$, $A_1(3)$, . . . calculated as described above. Then, on the basis of the pixel area $P_2$, the reflection point candidate $A_1$ (1), and the inclination angle $\theta_1$ (1) of the reflection surface at the reflection point candidate $A_1$ (1), the reflection point candidate selection section 130 calculates the intersection point $A_2$ (1) of the reflection surface (the tangent plane of the glass material 3) at the reflection point candidate $A_1(n)$ and the straight line $L_2$ of FIG. 6. Similarly, the reflection point candidate selection section 130 calculates the intersection points $A_2$ (2), $A_1$ (3), . . . of the reflection surface (the tangent plane of the glass material 3) at the respective reflection point candidates $A_1$ (2), $A_1$ (3), . . . and the straight line $L_2$ of FIG. 6.

With respect to the respective reflection point candidates $A_1$ (n), the inclination angle calculation section 150 obtains the reflection surfaces by which the light beams emitted from the pattern position $X_1$ on the pattern 4 and incident on the reflection point candidates $A_1$ (n) are reflected to the pixel area $P_1$ of the image capturing device 2 and calculates the inclination angles $\theta_1$ (n) of the respective reflection surfaces. As shown in FIG. 6, the inclination angles of the reflection surfaces can be obtained under a condition that the angle (the incident angle of the light beam incident on each reflection point candidate $A_1$ (n)) formed between the straight line connecting the pattern position $X_1$ to each reflection point candidate $A_1$ (n) and the normal line of the reflection surface is equal to the angle (the reflection angle of the light beam reflected from the reflection point candidate $A_1$ (n)) formed between the straight line connecting each reflection point candidate $A_1$ (n) to the pixel area $P_1$ of the image capturing device 2 and the normal line of the reflection surface.

Furthermore, similarly, with respect to the points $A_2$ (n) respectively corresponding to the reflection point candidates $A_1$ (n), the inclination angle calculation section 150 obtains the reflection surfaces by which the light beams emitted from the pattern position $X_2$ on the pattern 4 and incident on the points $A_2$ (n) are reflected to the pixel area $P_2$ of the image capturing device 2 and then calculates the inclination angles $\theta_2$ (n) of the reflection surfaces.

The height-direction coordinate determination section 160 compares the inclination angle $\theta_1$ (n) of the reflection surface at each reflection point candidate $A_1$ (n) with the inclination angle $\theta_2$ (n) of the reflection surface at the reflection point candidate $A_2$ (n) corresponding to the reflection point candidate $A_1$ (n). Then, the height-direction coordinate determination section 160 determines the reflection point candidate $A_1$ (n) at the time when the values of both $\theta_1$ (n) and $\theta_2$ (n) are coincident with each other as the true reflection point $A_1$ of the glass material 3 in the direction of the straight line $L_1$. In reality, strictly speaking, $\theta_1$ (n) and $\theta_2$ (n) do not become coincident due to measurement errors, etc. in some cases; hence, it may be possible to determine the true reflection point $A_1$ so that the square of the difference between $\theta_1(n)$ and $\theta_2(n)$ becomes minimal. In this way, the three-dimensional coordinate values (the positions in the horizontal directions and the position in the height direction) of one point (the reflection point $A_1$) on the glass material 3 in the direction as viewed from the image capturing device 2 to the pixel area $P_1$ are determined.

The output section 180 outputs the coordinate values (the coordinates of the position in the horizontal directions and the coordinate of the position in the height direction) of the position on the glass material 3 determined by the height-direction coordinate determination section 160. Furthermore, the output section 180 creates and outputs such shape information as shown in FIG. 9 and representing the surface shape of the glass material 3 on the basis of the respective coordinate values obtained by performing a similar measurement for numerous points on the glass material 3.

Figure 8:
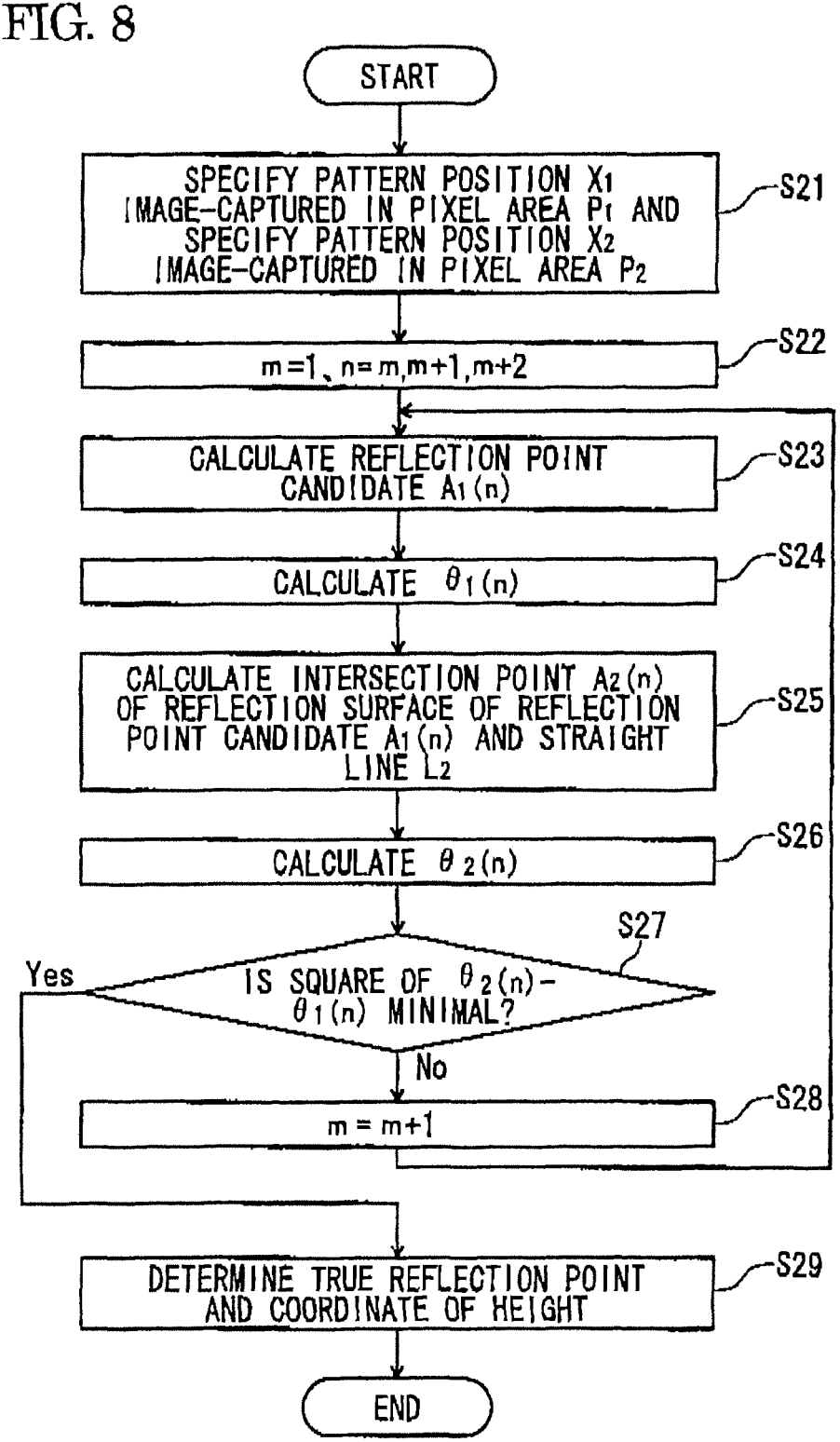
FIG. 8 is a flowchart showing an example of the operation of the shape measuring apparatus 100.

FIG. 8 is a flowchart showing an example of the operation of the shape measuring apparatus 100. The operation of the shape measuring apparatus 100 will be described below using the flowchart shown in FIG. 8. The flowchart is started when the pattern position specification section 120 obtains the captured image from the image capturing device 2.

In FIG. 8, from the patterns image-captured in the pixel area $P_1$ and the pixel area $P_2$ on the captured image, the pattern position specification section 120 having obtained the captured image specifies the pattern position $X_1$ and the pattern position $X_2$ on the pattern 4 corresponding to these patterns (at step S21).

Next, the reflection point candidate selection section 130 calculates the three reflection point candidates $A_1$ (n) by the setting of m=1, n=m, m+1, m+2 (at step S22 and step S23).

Next, the inclination angle calculation section 150 obtains a reflection surface having the reflection point candidate $A_1(n)$ as the reflection point and calculates its inclination angle $\theta_1(n)$ for each of the three points (at step S24).

Next, on the basis of the pixel area $P_2$, the reflection point candidate $A_1(n)$, and the inclination angle $\theta_1(n)$ of the reflection surface at the reflection point candidate $A_1(n)$, the reflection point candidate selection section 130 calculates the intersection point $A_2(n)$ of the reflection surface (the tangent plane of the glass material 3) at the reflection point candidate $A_1(n)$ and the straight line $L_2$ of FIG. 6 for each of the three points (at step S25).

Next, the inclination angle calculation section 150 obtains a reflection surface having the intersection point $A_2(n)$ as the reflection point and calculates its inclination angle $\theta_2(n)$ for each of the three points (at step S26).

Next, the height-direction coordinate determination section 160 obtains the square of the difference between the inclination angle $\theta_1(n)$ of each of the three points and the inclination angle $\theta_2(n)$ of each of the three points corresponding thereto, the inclination angles having been calculated as described above, and compares the difference of these, and then judges whether the difference is a minimal value (at step S27). In the case that the square of the difference between $\theta_1(n)$ and $\theta_2(n)$ is not a minimal value (No at step S27), m is incremented by 1 (at step S28); in other words, the processing from step S23 to step S27 is repeated for the three points where n has been incremented by 1.

In the case that the square of the difference between $\theta_1(n)$ and $\theta_2(n)$ is a minimal value (Yes at step S27), the height-direction coordinate determination section 160 determines the reflection point candidate $A_1(n)$ corresponding to $\theta_1(n)$ at the time as the true reflection point of the glass material 3 in the direction as viewed from the image capturing device 2 to the pixel area $P_1$ and then determines the value $H_n$ assumed as the height of the reflection point candidate $A_1(n)$ as the height direction coordinate of the true reflection point $A_1$ (at step S29).

The flowchart is thus completed.

In the search for the true height direction coordinate, the processing thereof is not limited to that described above, and it is not always necessary to calculate all the values from the minimum value to the maximum value of n. As a method for searching for this kind of solution, various kinds of known speeding up algorithms can be used as necessary.

Third Embodiment

Figure 11:
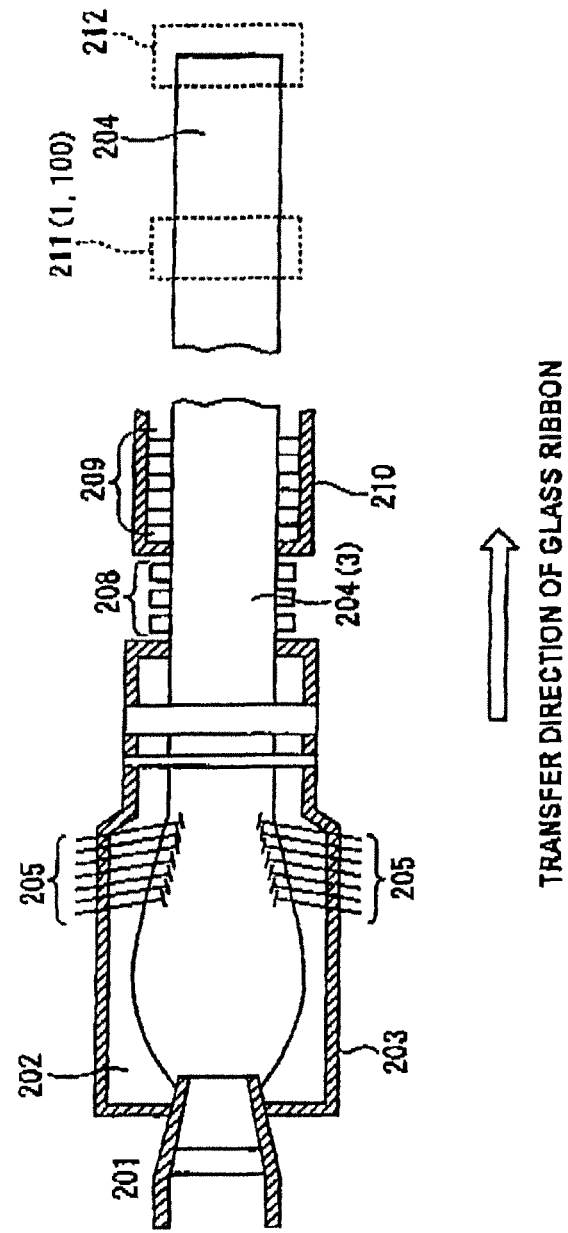
FIG. 11 is a schematic explanatory view showing a glass plate production line to which the shape measuring apparatus 1 or the shape measuring apparatus 100 is applied.
Figure 12:
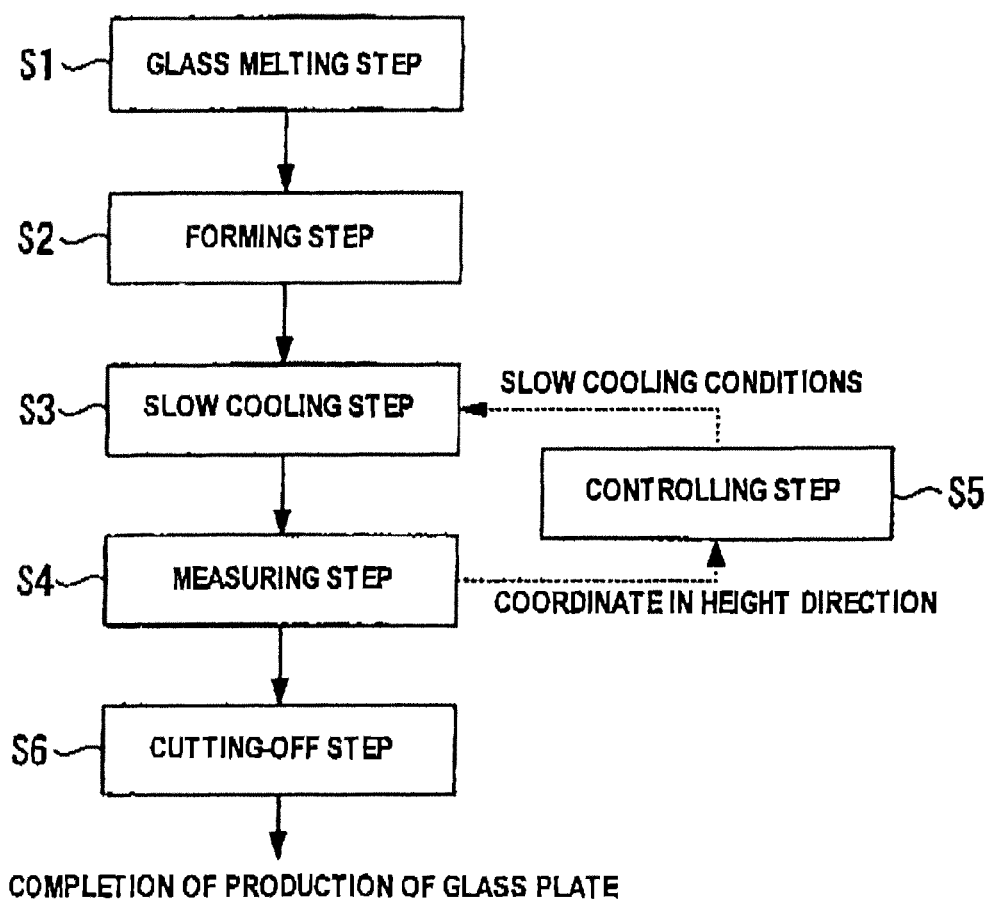
FIG. 12 is a flowchart showing the steps of a glass plate production method.

An example of application of the shape measuring apparatus 1 or the shape measuring apparatus 100 to a glass plate production line will be described below. FIG. 11 is a schematic explanatory view showing a glass plate production line to which the shape measuring apparatus 1 or the shape measuring apparatus 100 is applied. The glass plate production method in the production line shown in FIG. 11 has the step of melting glass raw materials to obtain molten glass; the step of forming the molten glass into a continuous plate-shaped glass ribbon; the step of slowly cooling the glass ribbon while moving the glass ribbon; and the step of cutting off the glass ribbon, the production method further having the step of measuring the height direction coordinate of the glass ribbon from the reference face thereof between the slow cooling step and the cutting off step using the shape measuring apparatus according to the present invention and the step of controlling slow cooling conditions in the slow cooling step on the basis of the height direction coordinate obtained in the measuring step. FIG. 12 shows the steps of the glass plate production method.

More specifically, in the step of producing the glass plate, in the case that a judgment is made that the warpage of the glass ribbon is large according to the results of height data obtained by the measuring method according to the present invention, slow cooling conditions in the slow cooling step, such as cooling speed and cooling temperature, are changed in consideration of the size and location of the warpage. Hence, defective shape due to warpage or breakage due to warpage can be prevented, and eventually glass plates can be produced in high yield.

Various kinds of methods, such as float, roll-out, down-draw, and fusion methods, are available in the forming step, and any one of these methods or another method can be used appropriately in the present invention. In the example of FIG. 11, a case in which the float method is used is taken as an example and described.

In the melting step (at S1 of FIG. 12), a batch formed by preparing and mixing raw materials, such as silica sand, limestone, and soda ash, according to the composition of a glass product is poured into a melting furnace, heated and melted at a temperature of approximately 1400° C. or more depending on the kind of glass to obtain molten glass. For example, the batch is poured into the melting furnace through one end of the melting furnace, and flame obtained by burning heavy oil or flame obtained by mixing natural gas with air and by burning the mixture is blown to the batch so that the batch is heated to a temperature of approximately 1550° C. or more and melted to obtain molten glass. Furthermore, the molten glass may be obtained using an electric melting furnace.

In the forming step (at S2 of FIG. 12), the molten glass obtained in the melting step is introduced from the downstream section 201 of the melting furnace to a molten tin bath 203, the molten glass is floated on molten tin 202 and moved in the transport direction shown in the figure, whereby a continuous plate-shaped glass ribbon 204 (corresponding to the glass material 3) is formed. At this time, for the purpose of forming the plate-shaped glass ribbon 204 having a predetermined thickness, rotating rolls (top rolls 205) press both side portions of the glass ribbon 204 to extend the glass ribbon 204 outward in the width direction thereof (a direction perpendicular to the transport direction).

In the slow cooling step (at S3 of FIG. 12), the glass ribbon 204 formed described above is drawn out from the molten tin bath 203 using lift out rolls 208, and the glass ribbon 204 is moved in the transport direction shown in the figure inside a slow cooling furnace 210 using metal rolls 209, whereby the glass ribbon 204 is slowly cooled and then further cooled continuously to near the ordinary temperature in the process between the transfer from the slow cooling furnace 210 and the cutting off step. The slow cooling furnace 210 is equipped with devices for supplying an amount of heat controlled using a combustion gas or an electric heater to perform slow cooling at necessary places in the furnace. The temperature of the glass ribbon 204 at the stage when the glass ribbon gets out of the slow cooling furnace 210 is equal to or less than the strain point of the glass of the glass ribbon 204; usually the glass ribbon is cooled to 150 to 250° C. depending on the kind of glass. The slow cooling step is executed to remove the residual stress inside the glass ribbon 204 and to lower the temperature of the glass ribbon 204. In the slow cooling step, the glass ribbon 204 passes through a measurement section 211 (corresponding to the shape measuring apparatus 1 or the shape measuring apparatus 100) and then is transferred to a glass ribbon cutting off section 212. The glass ribbon 204 having been cooled to near the ordinary temperature is cut off in the glass ribbon cutting off section 212 (at the cutting off step, S6 of FIG. 12). The temperature of the glass ribbon in the glass ribbon cutting off section 212 is usually in the range of the ambient temperature at the place to 50° C.

The image capturing position (that is, the position of the measurement section 211) of the glass ribbon 204 at the measuring step (S4 of FIG. 12) is the position in which the temperature of the glass ribbon 204 is equal to or less than the strain point of the glass. Usually, the measurement section 211 is preferably provided at a downstream position in the transfer direction from the glass ribbon outlet of the slow cooling furnace 210, and further preferably provided at a position where the temperature of the glass ribbon 204 is equal to or less than 200° C. Furthermore, the measurement section 211 can be provided immediately prior to the cutting off step; however, in the case that the data obtained from the measuring step is reflected to the cutting off step, the measurement section 211 is preferably provided at a position 30 cm or more or especially 1 meter or more away from the cutoff position depending on the movement speed of the glass ribbon 209.

At the controlling step (S5 of FIG. 12), controlling means (not shown) for calculating the slow cooling conditions inside the slow cooling furnace 210 is used on the basis of the height direction coordinate obtained at the measuring step. By the use of this controlling means, the conditions of the combustion gas or the electric heater provided inside the slow cooling furnace 210 are changed depending on slow cooling condition commands delivered to the slow cooling furnace 210. Hence, the amount of energy partially given to the glass ribbon 204 or the speed of supplying energy is changed, whereby control can be carried out to suppress deformation, such as warpage.

As described above, with each embodiment, even in the case of an object having a specular surface, the shape of a glass material can be measured by applying the stereo method. Furthermore, glass plates with high quality in shape can be produced by utilizing the results of the measurement of the shape.

The above-mentioned various processes relating to the shape measuring apparatus 1 (or the shape measuring apparatus 100) may be carried out by recording programs for executing the respective processes of the shape measuring apparatus 1 (or the shape measuring apparatus 100) on a computer-readable recording medium and by causing a computer system to read and execute the programs recorded on the recording medium. The "computer system" may include an OS or hardware, such as peripheral devices. Moreover, the "computer system" also includes an environment for providing home pages (or an environment for display) in the case that the WWW system is used. In addition, the "computer-readable recording medium" is a flexible disk; a magneto-optical disc; a writable non-volatile memory, such as a ROM or a flash memory; a portable medium, such as a CD-ROM; a hard disk built in the computer system; etc.

Furthermore, the "computer-readable recording medium" includes a medium that holds programs for a certain time, such as a volatile memory (for example, a DRAM (Dynamic Random Access Memory)) inside a computer system serving as a server or a client in the case that programs are transmitted via a network, such as the Internet, or via communication lines, such as telephone lines. Moreover, the above-mentioned programs may be transmitted from a computer system in which the programs are stored in a storage device or the like to another computer system via a transmission medium or a transmission wave in the transmission medium. The "transmission medium" for transmitting the programs is a medium having a function of transmitting information, including a network (communication network), such as the Internet, and communication lines (communication wires), such as telephone lines. What's more, the above-mentioned programs may be programs for realizing part of the above-mentioned function. Still further, the programs may be those capable of realizing the above-mentioned function by the combination with programs having already been stored in the computer system, that is, the so-called difference files (difference programs).

Although the embodiments of the present invention have been described in detail referring to the drawings, the specific configurations of the present invention are not limited to these embodiments, but the invention also includes designs within a range not departing from the gist of the invention.

Although the present application has been described in detail referring to the specific embodiments thereof, it is obvious to those skilled in the art that various changes and modifications may be made without departing from the spirit and scope of the present invention.

The present application is based on Japanese Patent Application (JPA No. 2010-130387) filed on Jun. 7, 2010, and the contents thereof are herein incorporated by reference.

EXPLANATION OF REFERENCE NUMERALS

1 . . . shape measuring apparatus
2 . . . image capturing device
3 . . . glass material
4 . . . pattern
20 . . . pattern position specification section
30 . . . reflection point candidate selection section
40 . . . pixel area specification section
50 . . . inclination angle calculation section
60 . . . height-direction coordinate determination section
80 . . . output section
100 . . . shape measuring apparatus
120 . . . pattern position specification section
130 . . . reflection point candidate selection section
150 . . . inclination angle calculation section
160 . . . height-direction coordinate determination section
180 . . . output section

The invention claimed is:

1. A shape measuring apparatus for measuring a shape of an object to be measured using captured images captured before and after a movement of the object to be measured having a specular surface by an image capturing device disposed at a fixed position and captured by reflecting a pattern disposed at a fixed position to the specular surface of the object to be measured, comprising:

an image capturing device configured to capture an image of a specular surface of an object to be measured; and
a processor comprising:
  a before-movement pattern position specification section configured to specify a before-movement image capturing pattern position serving as a position on a pattern that is image-captured in a before-movement captured image used as the captured image before the movement and on the pattern that is image-captured in a predetermined first pixel area of the image capturing device;
  a before-movement image capturing position calculation section configured to:
    assume the height direction coordinate of the object to be measured as a first height direction coordinate; and calculate a before-movement image capturing position serving as a position located on the specular surface of the object to be measured before the movement in which the height direction coordinate is assumed as the first height direction coordinate and image-captured in the first pixel area, based on the first height direction coordinate and the first pixel area;

a before-movement inclination angle calculation section configured to calculate a before-movement inclination angle serving as the inclination angle at the before-movement image capturing position at the time when the height direction coordinate is assumed as the first height direction coordinate, based on the first pixel area, the before-movement image capturing pattern position, and the before-movement image capturing position at the time when the height direction coordinate is assumed as the first height direction coordinate;

an after-movement image capturing position calculation section configured to calculate an after-movement image capturing position serving as a position located on the specular surface of the object to be measured after the movement in which the height direction coordinate is assumed as the first height direction coordinate and corresponding to the before-movement image capturing position at the time when the height direction coordinate is assumed as the first height direction coordinate;

a second pixel area specification section configured to specify a second pixel area in which the after-movement image capturing position at the time when the height direction coordinate is assumed as the first height direction coordinate is image-captured in the pixel area of the image capturing device and in an after-movement captured image serving as the captured image after the movement;

an after-movement pattern position specification section configured to specify an after-movement image capturing pattern position serving as a position on the pattern that is image-captured in the after-movement captured image and on the pattern that is image-captured in the second pixel area;

an after-movement inclination angle calculation section configured to calculate an after-movement inclination angle serving as an inclination angle at the after-movement image capturing position at the time when the height direction coordinate is assumed as the first height direction coordinate, based on the after-movement image capturing position at the time when the height direction coordinate of the object to be measured is assumed as first height direction coordinate, the second pixel area, and the after-movement image capturing pattern position; and a height-direction coordinate determination section configured to:
compare the before-movement inclination angle with the after-movement inclination angle at the time when the height direction coordinate of the object to be measured is assumed as the first height direction coordinate; and
determine that the height direction coordinate when the before-movement inclination angle equals the after-movement inclination angle is an actual height direction coordinate at the before-movement image capturing position of the object to be measured.

2. The shape measuring apparatus according to claim 1, wherein the processor further comprises an output section configured to output shape information of the specular surface of the object to be measured based on the determined actual height direction coordinate at a plurality of the before-movement image capturing positions.

3. A glass plate production method comprising: melting glass raw materials to obtain molten glass; forming the molten glass into a continuous plate-shaped glass ribbon; cooling the glass ribbon while moving the glass ribbon; and cutting off the glass ribbon, the production method further comprising:
measuring the height direction coordinate of the glass ribbon from a reference face thereof between the cooling and the cutting off using the shape measuring apparatus according to claim 1, and
controlling cooling conditions in the cooling based on the height direction coordinate obtained in the measuring.

4. glass plate production method comprising: melting glass raw materials to obtain molten glass; forming the molten glass into a continuous plate-shaped glass ribbon; cooling the glass ribbon while moving the glass ribbon; and cutting off the glass ribbon, the production method further comprising:
measuring the height direction coordinate of the glass ribbon from a reference face thereof using the shape measuring apparatus according to claim 1.

5. A shape measuring apparatus-for measuring a shape of an object to be measured using captured images of the object to be measured having a specular surface captured by an image capturing device disposed at a fixed position and captured by reflecting a pattern disposed at a fixed position to the specular surface of the object to be measured, comprising:
an image capturing device configured to capture an image of a specular surface of an object to be measured; and
a processor comprising:
a first pattern position specification section configured to specify a first image capturing pattern position serving as a position on the pattern that is image-captured in the captured image and on the pattern that is image-captured in a predetermined first pixel area of the image capturing device;
a second pattern position specification section configured to specify a second image capturing pattern position serving as a position on the pattern that is image-captured in the captured image and on the pattern that is image-captured in a predetermined second pixel area of the image capturing device;
a first image capturing position calculation section configured to:
assume the height direction coordinate of the object to be measured as a first height direction coordinate; and
calculate a first image capturing position serving as a position located on the specular surface of the object to be measured in which the height direction coordinate is assumed as the first height direction coordinate and image-captured in the first pixel area, based on the first height direction coordinate and the first pixel area;
a first inclination angle calculation section configured to calculate a first inclination angle serving as the inclination angle at the first image capturing position at the time when the height direction coordinate is assumed as the first height direction coordinate, based on the first pixel area, the first image capturing pattern position, and the first image capturing position at the time when the height direction coordinate is assumed as the first height direction coordinate;

a second image capturing position calculation section configured to calculate a second image capturing position serving as a position located on the specular surface of the object to be measured in which the height direction coordinate is assumed as the first height direction coordinate and image-captured in the second pixel area, based on the second pixel area, the first image capturing position at the time when the height direction coordinate is assumed as the first height direction coordinate, and the first inclination angle;

a second inclination angle calculation section configured to calculate a second inclination angle serving as the inclination angle at the second image capturing position at the time when the height direction coordinate is assumed as the first height direction coordinate, based on the second pixel area, the second image capturing pattern position, and the second image capturing position at the time when the height direction coordinate of the object to be measured is assumed as the first height direction coordinate; and a height-direction coordinate determination section configured to:
compare the first inclination angle with the second inclination angle at the time when the height direction coordinate of the object to be measured is assumed as the first height direction coordinate; and
determine that the height direction coordinate when the first inclination angle equals the second inclination angle is an actual height direction coordinate at the first image capturing position of the object to be measured.

6. The shape measuring apparatus according to claim 5, wherein the processor further comprises an output section configured to output processing information according to which the object to be measured is processed based on the determined actual height direction coordinate at a plurality of the first image capturing positions.

7. A glass plate production method comprising: melting glass raw materials to obtain molten glass; forming the molten glass into a continuous plate-shaped glass ribbon; cooling the glass ribbon while moving the glass ribbon; and cutting off the glass ribbon, the production method further comprising:
measuring the height direction coordinate of the glass ribbon from a reference face thereof between the cooling and the cutting off using the shape measuring apparatus according to claim 5, and
controlling cooling conditions in the cooling based on the height direction coordinate obtained in the measuring.

8. A glass plate production method comprising: melting glass raw materials to obtain molten glass; forming the molten glass into a continuous plate-shaped glass ribbon; cooling the glass ribbon while moving the glass ribbon; and cutting off the glass ribbon, the production method further comprising:
measuring the height direction coordinate of the glass ribbon from a reference face thereof using the shape measuring apparatus according to claim 5.

9. A shape measuring method for measuring a shape of an object to be measured using captured images captured before and after a movement of the object to be measured having a specular surface by an image capturing device disposed at a fixed position and captured by reflecting a pattern disposed at a fixed position to the specular surface of the object to be measured, comprising:
capturing an image of a specular surface of an object to be measured using an image capturing device; and
using a processor to:
specify a before-movement image capturing pattern position serving as a position on the pattern that is image-captured in a before-movement captured image used as the captured image before the movement and on the pattern that is image-captured in a predetermined first pixel area of the image capturing device;
assume the height direction coordinate of the object to be measured as a first height direction coordinate, and calculate a before-movement image capturing position serving as a position located on the specular surface of the object to be measured before the movement in which the height direction coordinate is assumed as the first height direction coordinate and image-captured in the first pixel area, based on the first height direction coordinate and the first pixel area;
calculate a before-movement inclination angle serving as the inclination angle at the before-movement image capturing position at the time when the height direction coordinate is assumed as the first height direction coordinate, based on the first pixel area, the before-movement image capturing pattern position, and the before-movement image capturing position at the time when the height direction coordinate is assumed as the first height direction coordinate;
calculate an after-movement image capturing position serving as a position located on the specular surface of the object to be measured after the movement in which the height direction coordinate is assumed as the first height direction coordinate and corresponding to the before-movement image capturing position at the time when the height direction coordinate is assumed as the first height direction coordinate;
specify a second pixel area in which the after-movement image capturing position at the time when the height direction coordinate is assumed as the first height direction coordinate is image-captured in the pixel area of the image capturing device and in an after-movement captured image serving as the captured image after the movement;
specify an after-movement image capturing pattern position serving as a position on the pattern that is image-captured in the after-movement captured image and on the pattern that is image-captured in the second pixel area;
calculate an after-movement inclination angle serving as an inclination angle at the after-movement image capturing position at the time when the height direction coordinate is assumed as the first height direction coordinate, based on the after-movement image capturing position at the time when the height direction coordinate of the object to be measured is assumed as the first height direction coordinate, the second pixel area, and the after-movement image capturing pattern position; and
compare the before-movement inclination angle with the after-movement inclination angle at the time when the height direction coordinate of the object to be measured is assumed as the first height direction coordinate, and determine that the height direction coordinate when the before-movement inclination angle equals the after-movement inclination angle is an actual height direction coordinate at the before-movement image capturing position of the object to be measured.

10. A shape measuring method for measuring a shape of an object to be measured using captured images of the object to be measured having a specular surface captured by an image capturing device disposed at a fixed position and captured by reflecting a pattern disposed at a fixed position to the specular surface of the object to be measured, comprising:

capturing an image of a specular surface of an object to be measured using an image capturing device; and using a processor to:

specify a first image capturing pattern position serving as a position on the pattern that is image-captured in the captured image and on the pattern that is image-captured in a predetermined first pixel area of the image capturing device;

specify a second image capturing pattern position serving as a position on the pattern that is image-captured in the captured image and on the pattern that is image-captured in a predetermined second pixel area of the image capturing device;

assume the height direction coordinate of the object to be measured as a first height direction coordinate, and calculate a first image capturing position serving as a position located on the specular surface of the object to be measured in which the height direction coordinate is assumed as the first height direction coordinate and image-captured in the first pixel area, based on the first height direction coordinate and the first pixel area;

calculate a first inclination angle serving as the inclination angle at the first image capturing position at the time when the height direction coordinate is assumed as the first height direction coordinate, based on the first pixel area, the first image capturing pattern position, and the first image capturing position at the time when the height direction coordinate is assumed as the first height direction coordinate;

calculate a second image capturing position serving as a position located on the specular surface of the object to be measured in which the height direction coordinate is assumed as the first height direction coordinate and image-captured in the second pixel area, based on the second pixel area, the first image capturing position at the time when the height direction coordinate is assumed as the first height direction coordinate, and the first inclination angle;

calculate a second inclination angle serving as the inclination angle at the second image capturing position at the time when the height direction coordinate is assumed as the first height direction coordinate, based on the second pixel area, the second image capturing pattern position, and the second image capturing position at the time when the height direction coordinate of the object to be measured is assumed as the first height direction coordinate; and compare the first inclination angle with the second inclination angle at the time when the height direction coordinate of the object to be measured is assumed as the first height direction coordinate, and determine that the height direction coordinate when the first inclination angle equals the second inclination angle is an actual height direction coordinate at the first image capturing position of the object to be measured.

* * * * *